United States Patent [19]

Gilliland

[11] Patent Number: 5,057,665

[45] Date of Patent: Oct. 15, 1991

[54] ELECTRONIC ARC WELDING STATION WITH INPUT VOLTAGE COMPENSATION

[76] Inventor: Malcolm T. Gilliland, 310 Pine Valley Rd., Marietta, Ga. 30067

[21] Appl. No.: 447,527

[22] Filed: Dec. 7, 1989

Related U.S. Application Data

[60] Continuation of Ser. No. 118,613, Nov. 9, 1987, Pat. No. 4,887,046, which is a division of Ser. No. 791,224, Oct. 25, 1985, Pat. No. 4,716,274.

[51] Int. Cl.$^5$ .............................................. B23K 9/10
[52] U.S. Cl. ......................... 219/130.21; 219/130.51
[58] Field of Search ..................... 219/130.21, 130.31, 219/130.33, 137 PS, 130.51

[56] References Cited

U.S. PATENT DOCUMENTS 3,602,832 8/1971 Raymond ............................ 330/86
4,536,666 8/1985 Metz et al. .......................... 307/494

FOREIGN PATENT DOCUMENTS 53-91042 8/1978 Japan ............................. 219/130.31
60-187470 9/1985 Japan ............................. 219/130.21

OTHER PUBLICATIONS

National Semiconductor Data Sheets for LM3524; pp. 1–115 Through 1–129; 1980 Linear Databook.

Primary Examiner—Clifford C. Shaw
Attorney, Agent, or Firm—Jones, Askew & Lunsford

[57] ABSTRACT

An improved welding system is shown. A single high capacity power supply (10) provides operating power for several weld selector stations (16). Each weld selector station (16) operates independently, is adjustable, and allows a welder to obtain the voltage and current characteristics desired for his particular welding operation. Each weld selector station (16) operates over a wide range of input voltages so that long runs of low-voltage interconnecting cable (14,15) can be used without adversely affecting the quality of the weld. Furthermore, the weld selector station (16) is small, lightweight and easily transportable. The result is a more efficient, less expensive, versatile welding system.

20 Claims, 9 Drawing Sheets

ELECTRONIC ARC WELDING STATION WITH INPUT VOLTAGE COMPENSATION

This is a continuation application of U.S. patent application Ser. No. 118,613, filed Nov. 9, 1987, now U.S. Pat. No. 4,887,046 which is a divisional application of U.S. patent application Ser. No. 791,224, filed Oct. 25, 1985, and is now U.S. Pat. No. 4,716,274, dated Dec. 29, 1987.

TECHNICAL FIELD

The present invention relates to welding power supplies and in particular to improved distributed welding power supply systems having a single, relatively high voltage power source, and a plurality of physically distributed power regulators and DC-to-DC converters for use by a plurality of individual welders.

BACKGROUND OF THE INVENTION

The present invention is an improvement to welding power supplies particularly suited for environments in which a relatively large number of welders are working in the area. The present invention is particularly useful in environments in which welding must be done in relatively small cramped areas. In particular, the environment of a shipyard is one in which the present invention is particularly useful.

As is known to those skilled in the art, welding jobs in shipyards normally include a relatively large number of welders welding simultaneously. Additionally, in the construction or repair of a ship, it is often necessary for a welder to work in relatively cramped quarters within the interior of a ship.

Prior art arrangements have normally included a relatively large number of power supplies, one for each welder. Such an arrangement is time consuming and expensive since it requires multiple drops of three-phase high voltage AC lines to supply the various power supplies. As is known to those skilled in the art, accidental cutting of high voltage AC power lines leads to much more dangerous situations than similar accidents involving the lower voltage DC lines.

Furthermore, lack of reasonable access to the AC power lines and/or the impracticality of or undesirability of moving the prior art power supply sometimes creates a situation wherein the prior art power supply is substantially removed from the welder and a long run of welding cable is required. Since the low voltage high current outputs of such welding power supplies require large gauge cables, pulling long runs of these cables around a shipyard or similar environment is cumbersome, results in increased $I^2R$ losses as the cable length increases, and causes variations in the quality of the weld because of the distributed inductance, capacitance and resistance of long runs of cable.

Additionally, the use of multiple individual welding power supplies necessarily means duplication of one of the most expensive components of a power supply, a large, high current three-phase transformer.

Thus, as explained in greater detail hereinbelow, the present invention provides a distributed welding power supply system which overcomes some of these disadvantages. The system of the present invention generally consists of a single high power regulated power supply and a plurality of distributed weld selector stations. Within each weld selector station there are a number of elements essentially similar to a smaller welding power supply. Therefore, it is appropriate to consider other aspects of the background of the art of solid state welding power supplies in connection with the weld selector stations used in the present system.

Again considering the environment of a shipyard as a typical environment for welding, it is highly desirable to provide a power supply which is usable in a relatively large number of welding processes. In particular, there are a number of variations in the electrical output characteristics of a welding power supply which affect its utility in particular welding processes. Among these are the output impedance and the turn-on and turn-off time or the dV/dt (dI/dt) characteristics of the voltage output (current output) of the supply. For example, in tungsten inert gas (TIG) and stick welding, it is generally desirable to have a power supply with a high output impedance so that its characteristics approximate a constant current source. In metal inert gas (MIG) and pulse arc welding, it is often desirable to have a power supply with a low output impedance which approximates a constant voltage source. There are, of course, other types of welding which require a compromise between these characteristics.

Another aspect of a welding environment well known to those skilled in the art is the fact that large transients are present in the main current carrying cables within a welding system. The use of pulse width modulators to control solid state switching devices to adjust output voltage has been known in the art for some period of time. Generally, such pulse width modulators are constructed using relatively low voltage solid state integrated circuits. Such circuits are provided with well regulated and well by-passed low voltage power supplies so that they will operate properly.

One problem with prior art power supplies of this type occurs from transients which occur on the DC input to a welding power supply switching regulator operated by the pulse switch modulator. When an arc is struck, there is normally a large current surge initially drawn from the output of the power supply which normally lowers the voltage at the input of the regulator. A problem which arose in designing a system of the present invention was the fact that multiple welders are operating weld selector stations off of a single power supply output. As various welders using the system strike arcs, the overall output voltage of the main supply, and thus the input voltage to the various weld selector stations, will drop. Thus, it is desirable to provide a feedback system for pulse width modulators used in a distributed welding power supply system which will respond to changes in the input voltage to the weld selector station.

Additionally, in some welding environments there are a large number of remote welding units which include wire feed motors and shielding gas valves, for example, of the type shown in applicant's U.S. Pat. No. 4,119,830, issued Oct. 10, 1978. The voltage supply to the wire feed motor normally fluctuates with the voltage supplied by the power supply output. Also, in some types of MIG welding, the output voltage is lower than that required to drive the wire feed motor. Thus, there is a need to assure that the voltage to the wire feed motor will not become excessive so as to damage the motor or inadequate so as to cause stalling or erratic operation.

Furthermore, in many prior art systems, a high power resistance box is used to obtain the desired output voltage, current and impedance. These boxes can consume substantial amounts of power which must be dissipated as waste heat, lowers the energy and cost efficiency of the system, and requires additional air flow or cooling.

Lastly, there is a problem in the state of the prior art, not limited to the environment of welding power supplies, which has been overcome by the present invention. As is well known to those skilled in the art, the design of reliable push-pull amplifiers, whether they be linear amplifiers or push-pull devices used in switching power supply regulators, have always been considered to require closely matched pairs of output devices. This goes back to the days of push-pull vacuum tube audio amplifiers. In the design of push-pull solid state amplifiers, this problem has become more critical since excessive gain in one transistor of a push-pull amplifier stage normally leads to greater power dissipation and thus a higher operating temperature for that particular transistor. As the operating temperature increases, the beta of the transistor tends to increase, and this ultimately leads to a condition known as thermal run-away in which the higher beta transistor will be destroyed.

As is also known to those skilled in the art, matched pairs of transistors of a particular type tend to be considerably more expensive than individual transistors of the same type. This cost increase becomes even greater when relatively high current devices, such as those used in relatively large switching power supplies, are used. Thus, there is a need in the art to provide a practical and reliable arrangement for designing push-pull amplifier output stages (which may be used in switching power supplies, linear amplifiers, and other applications for push-pull topology) which can eliminate the requirement for transistors having closely matched betas and thermal characteristics.

SUMMARY OF THE INVENTION

The present invention overcomes the drawbacks of the prior art recited above and provides some less expensive advantageous arrangements for accomplishing some end results known in the prior art. Broadly stated, the system of the present invention is a distributed welding power supply system in which one large relatively high voltage high power supply (80 volts at 1500 amps continuous in the preferred embodiment) is used to power a plurality of relatively small weld selector station units which are essentially high current DC to DC converters. Each weld selector station may be operated in a constant current mode, a constant voltage mode, or a variable combination of the two. Additionally, each weld selector station uses a pulse width modulated switching to control the output power from the weld selector station. The pulse width modulator controlling the output of each weld selector station is arranged to respond to drops in the input voltage rather than use of conventional arc voltage feedback in order to maintain a nominally constant output.

Because each weld selector station unit is supplied from a higher voltage source than most conventional welding equipment, the weld selector station may be connected the main power supply via smaller gauge cabling than that normally used to connect a weld torch to a conventional 40-volt supply. The weld selector stations of the preferred embodiment are such that they can be readily implemented in a small cabinet, weighing approximately eighty pounds, which may be easily transported into confined spaces by two people.

Among the advantageous features of the weld selector station of the present invention are a switch for automatically selecting a source of input voltage for a wire feed motor to be used with a welding torch connected to the output of the weld selector station. For applications in which the nominal output voltage from the weld selector station is adequate to drive the wire feed motor, the wire feed motor circuitry is connected directly to the output of the weld selector station. When a lower output voltage is selected, for example in a number of metal inert gas (MIG) processes, the system automatically switches the source of the wire feed motor voltage to one of several user selectable voltage dividers, one of which is selected to pick off a predetermined portion of the input voltage to the weld selector station.

Another advantageous aspect of the weld selector station of the present system, which applies to welding power suppliees in general, is the drive circuitry for the main switching transistors. The base of the switching transistors are driven by a pair of metal oxide semiconductor field effect transistors (MOSFETs), one of which is a P-channel type and one of which is an N-channel type. The FETs have their source terminals tied together to the base of the main switching transistor. The gates of each of the FETs have independently adjustable impedances connected between them and the source of a pulse width modulated control signal for controlling the output of the weld selector station. By adopting this arrangement, the independently adjustable gate impedances varies the rise and fall times of the output of the main switching transistors. As is known to those skilled in the art, various welding processes respond differently to the transient characteristics of the output from the switching device from a switching power supply.

Additionally, the P-channel FET is selectably switchable in and out of the base drive circuit. When it is in the circuit, it causes the base of the main switching transistor to be driven to a voltage lower than the emitter, thus depleting charge carriers in the base region, thereby causing the main transistor to turn off very rapidly. When more gradual turn-off the switching transistors is desired, the drive to the P-channel FET may be reduced or it may be removed from the base drive circuit.

Additionally, the present invention includes a novel arrangement for biasing a pair of transistors used in a push-pull configuration. In the preferred embodiment of the present invention, the push-pull stage in question is driving the primary of a power transformer which is used in generating well regulated lower voltage power supplies used to power a number of the lower voltage integrated circuit components in the preferred embodiment. However, the principle of this aspect of the present invention has utility in a large number of other applications in which power transistors are interconnected in a fashion in which they need to conduct substantially equal amounts of average current in order to avoid the circumstances of one transistor going into thermal run-away. For example, push-pull power output stages in audio amplifiers may benefit from this aspect of the present invention. Also, parallel power transistor configurations may be rendered less expensive by adoption of this aspect of the present invention.

Generally stated, this aspect of the present invention can be used to provide considerable cost savings to the manufacturer of devices which normally require matched pairs of set of transistors. As is known to those skilled in the art, matched pairs of transistors are ones (often obtained from the same die during fabrication) which have closely matched characteristics. Of particular concern is the forward current gain or beta, of transistors having similar or common base drives. As noted above, in the preferred embodiment, the arrangement meeting this requirement is that of a push-pull switching amplifier driving an inductive load.

As is known to those skilled in the art, if one of the transistors in such an arrangement has a somewhat higher beta than the other. It will draw more current than the other transistor. This leads to a situation in which the junction temperature of the higher beta transistor becomes higher than that of the other transistor. As junction temperature increases, beta increases and thus the situation is exacerbated by a form of positive feedback.

As is known to those skilled in the art, eventually this situation leads to thermal run-away and destruction of the higher beta transistor. This is why such amplifier arrangements are conventionally constructed using matched pairs of devices. In the situation of parallel drive transistors, unless power wasting emitter resistors are used, one transistor tends to "hog" more current than the others. Under these circumstances, the collector-emitter saturation voltage is also decreased as the transistor heats up, and destruction of one of the devices often results, frequently followed by a chain reaction destruction of the other transistors as they try to accommodate the increase in current caused by the destruction of the first transistor.

The main drawback to matched transistors, particularly relatively high power devices, is that they are much more expensive than buying a plurality of transistors of the same type which do not necessarily have their characteristics closely matched, other than the extent to which they are matched by virtue of being the same type device. The present invention provides a mechanism for using non-matched pairs of transistors in circumstances in which the conventional wisdom of the prior art dictates that matched pairs be used.

Broadly stated, this aspect of the present invention provides thermally sensitive base drive to each of the transistors in question. Each of the thermally sensitive base drive elements is thermally coupled to a heat sink connected to the other transistor of the pair. In the preferred embodiment, each transistor includes a base emitter resistor having a positive temperature coefficient which is mounted on the heat sink or case of the other transistor. As a second transistor becomes hotter than a first transistor, the base emitter resistor of the first transistor heats up, thus increasing its value. This has the effect of shunting less of the input current from the base of the first transistor, thus increasing the first transistor's base drive. Therefore, the first transistor begins conducting more current and the pair moves toward an equilibrium condition.

In the preferred embodiment, a potentiometer is connected as a variable resistor between the common connection between the emitters of the drive transistors and a switch. The switch is configured to selectively connect the other end of the variable resistor to the base of either of the drive transistors. This arrangement is used to initially calibrate the transistor pair. The switch is moved back and forth between the two bases as the variable resistance is adjusted until an initial condition of equality between the currents conducted by the two transistors is established. Once the device is subsequently operated, the above-referenced thermal feedback connection is used to maintain this initially established equilibrium.

Therefore, it is an object of the present invention to provide an improved system for providing welding power in an environment in which a large number of welders are working simultaneously.

It is a further object of the present invention to provide a distributed welding power supply system employing one master power supply and a plurality of lightweight weld selector stations which is less expensive and more energy efficient than provision of an equivalent amount of power through the use of individual supplies.

It is a further object of the present invention to provide a switching power supply output stage for a welding power supply employing switching transistors which have selectively variable turn-on and turn-off characteristics.

It is a further object of the present invention to provide a pulse width modulated control switching welding power supply which has a selectively variable pulse width which responds to a drop in the input voltage to the regulator to increase the pulse width, thus maintaining a nominally constant output power.

It is also an object of the present invention to provide a variable voltage output welding power supply which includes apparatus for automatically switching the source of voltage used to drive a wire feed motor at a remote welding torch.

It is still a further object of the present invention to provide an inexpensive implementation of a standard transistor circuit by providing apparatus which allows the use of unmatched pairs of transistors in a circuit configuration normally requiring matched pairs.

It is a further object of the present invention to provide a distributed welding power supply system which allows a plurality of welders to select different output voltages and use different welding methods such as stick, TIG or MIG, while all being powered from a common power supply.

That the present invention accomplishes these objectives, and overcomes the drawbacks of the prior art noted above, will be apparent from the detailed description of the preferred embodiment below.

DETAILED DESCRIPTION

Figure 1:
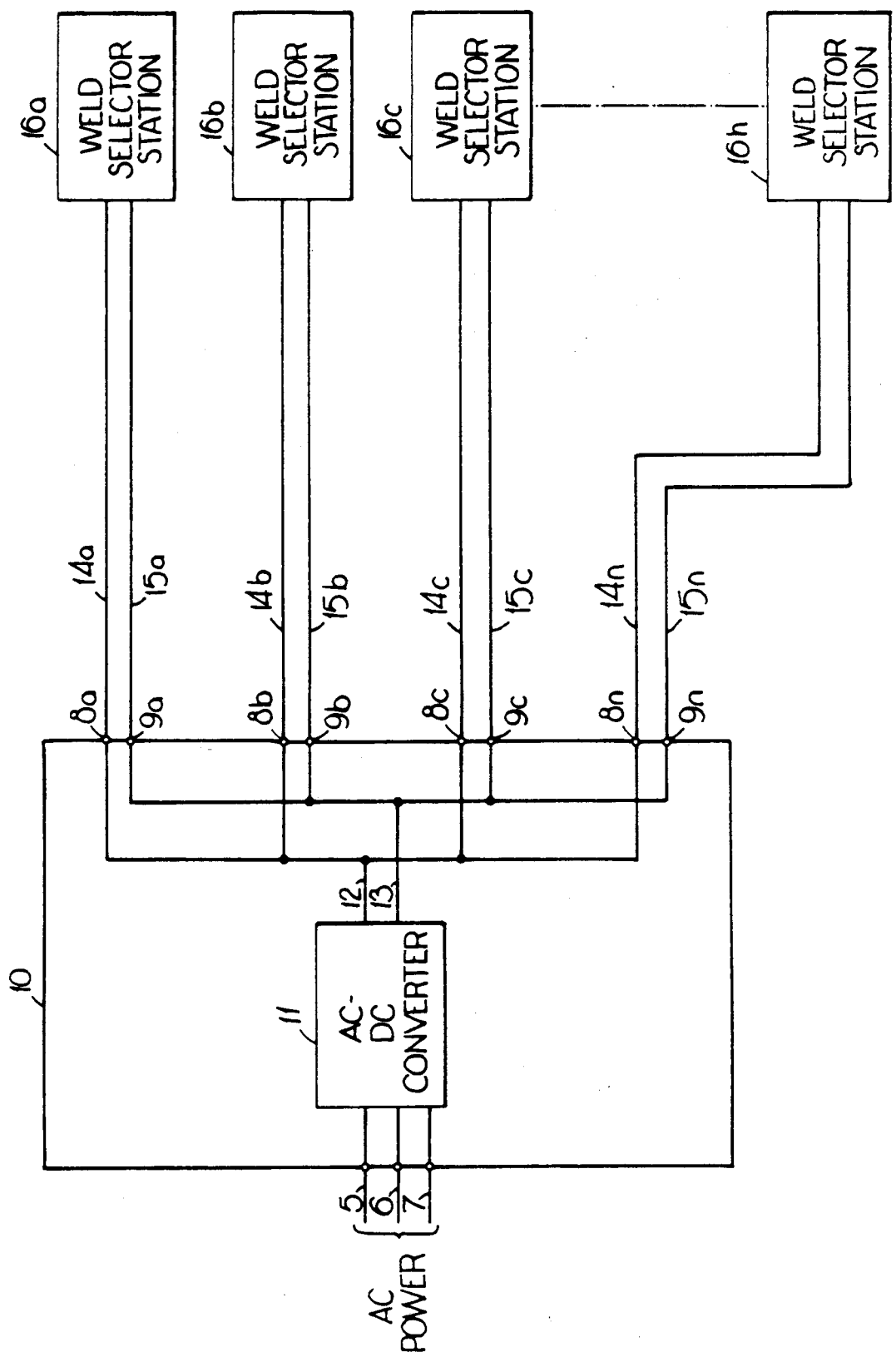
FIG. 1 is a block diagram of the preferred embodiment of the present invention.

Turning now to the drawings, in which like numerals reference like elements throughout the several drawings, the preferred embodiment of the present invention will be described. As shown in FIG. 1, the preferred form of the present invention is a central welding power supply 10 feeding a number of remote weld selector stations 16a-16n. Central welding power supply 10 contains a single AC-to-DC converter 11 for providing power to the weld selector stations 16a-n.

Converter 11 is connected to a source of three-phase AC power (not shown), normally of 460 or 230 volts, by conductors 5, 6 and 7. The positive output of AC-to-DC converter 11 is connected by conductor 12 to a number of positive output studs 8a-8n. The negative, or return, output of converter 11 is connected by conductor 13 to a number of grounded output studs 9a-9n. It will be appreciated that the studs 8 and 9 are conventional in nature and provide the connection point at the weld selector station for the welder.

Converter 11 provides an output of 80 volts DC (nominal) at a current sufficient to power the desired number of remote weld selector stations 16a-16n. In the preferred embodiment, converter 11 provides 1500 amps (continuous) current. Methods of construction of central power supply 10 are well known to those skilled in the art. Remote weld selector stations 16a-16n are connected by conductors 14a-14n and 15a-15n to studs 8a-8n and 9a-9n, respectively.

Each remote weld selector station 16 can accept an input voltage of 30 to 150 volts (80 volts nominal) and has its own controls for varying voltage and current characteristics. This allows a welder using a remote weld selector station 16a to adjust the voltage and current output characteristics to match the type of welding that welder is performing without affecting the voltage and current characteristics of remote weld selector stations 16b-16n.

It will be appreciated the present invention requires only a single central power supply 10 and a single AC power connection instead of the multiple power supplies and AC power connections of conventional systems. Furthermore, it will be appreciated that since the remote weld selector station 16 weighs only 80 pounds it can be readily moved from place to place as required.

It will also be appreciated that, in conventional welding systems, because of the high currents involved, the length of the electrical cable between power supply and welder has a significant effect on the quality of the welding performed. Each remote weld selector station 16 therefore acts as a buffer between the central power supply 10 and the welder. It will therefore be appreciated that the present invention effectively reduces the length of electrical cable to the short distance between the remote weld selector station 16 and the welder. The present invention therefore reduces the cost of a welding system by minimizing the amount of expensive control cable and gas hose used. The present invention also reduces the cost of a welding system by consolidating several smaller power supplies into one central power supply 10 and greatly reducing the number of AC power connections that must be installed.

Weld selector station 16 may be briefly described as a high efficiency, overload protected, selectable constant current or constant voltage switching power supply with automatic compensation for input voltage fluctuation, and selectable low frequency pulse, high frequency pulse, and chopped low frequency pulse outputs.

Figure 2:
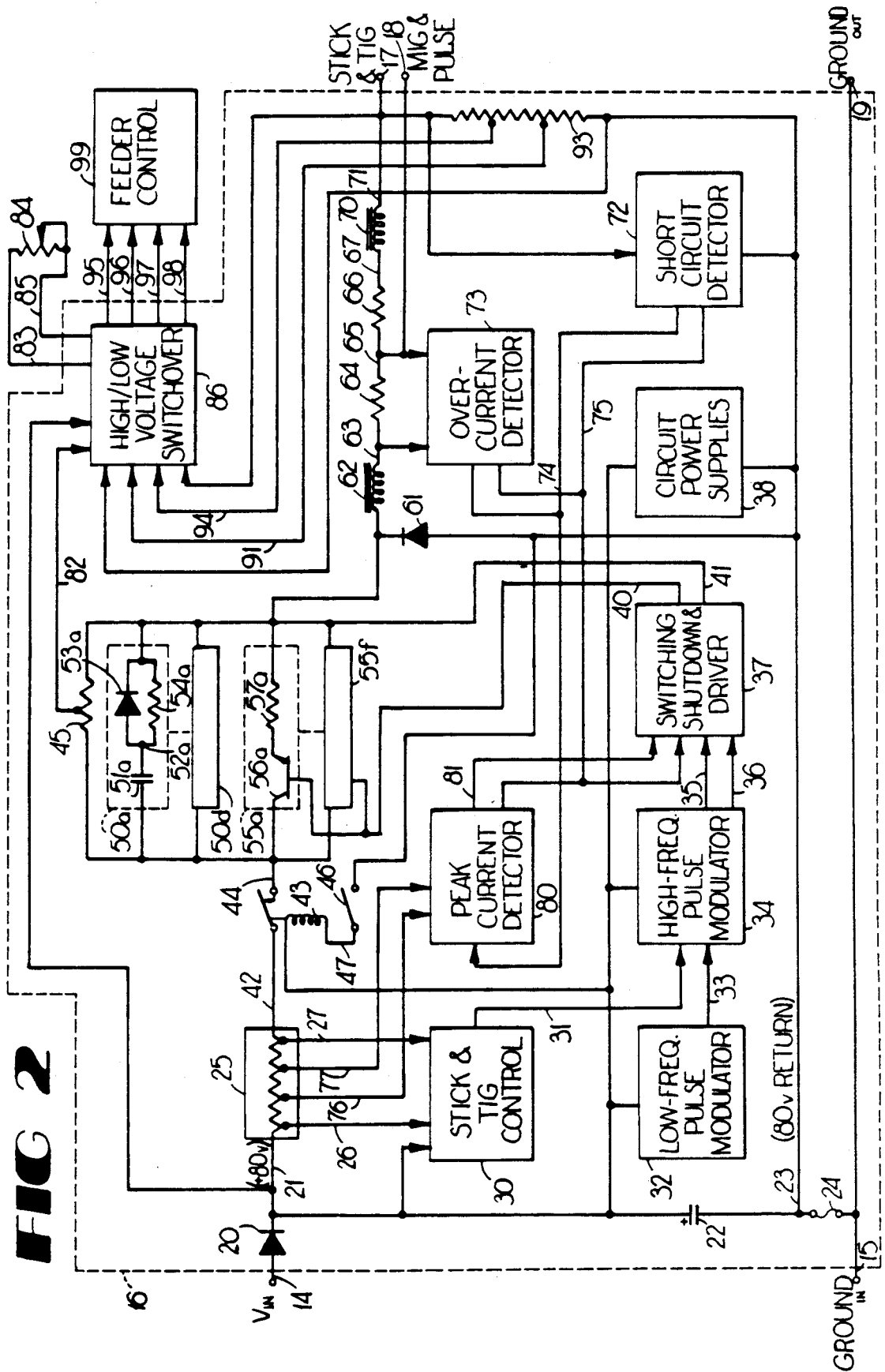
FIG. 2 is a block diagram of the weld selector station of the preferred embodiment.

Turn now to FIG. 2, which is a block diagram of a remote weld selector station 16. High efficiency is obtained by the use of switching transistors 56a-56f, inductor 62, and a free wheeling diode 61. Transistors 56a-56f are rapidly switched on and off to provide a desired current or voltage at output studs 17 and 18 instead of the conventional manner of using an array of high power dissipation resistors.

The positive 80 volt DC conductor 14 is connected to the anode of a diode 20. Diode 20 protects weld selector 16 in the event that a negative voltage is applied to conductor 14. The cathode of diode 20 is connected by conductor 21, the internal positive 80 volt DC line, to a resistance bar 25, the STICK & TIG control circuit 30, the low frequency pulsewidth modulator 32, the high frequency pulsewidth modulator 34, the circuit power supplies 38, the high/low voltage switchover circuit 86, the positive terminal of 10,000 microfarad storage capacitor 22, and to one end of the coil of relay 43.

Storage capacitor 22 stores power from and absorbs voltage surges on VIN conductor 14 and provides a low impedance source which can provide large welding currents for a short period. Diode 20 also prevents capacitor 22 from discharging into VIN conductor 14 in the event that the voltage on VIN conductor 14 should fall below the voltage on conductor 21. Diode 20 and capacitor 22 therefore isolate the output of weld selector station 16 from transients caused by other welding operations and from the distributed inductance/capacitance/resistance characteristics of conductors 14 and 15.

The ground connector 15 is connected to one end of a fuse 24 and to the ground output stud 19. The other end of fuse 24 is connected by conductor 23 to the negative terminal of capacitor 22, the circuit power supplies 38, the anode of diode 61, one end of ON/OFF power switch 46, and the high/low voltage switchover circuit 86. The other end of switch 46 is connected by conductor 47 to the other end of the coil of relay 43. Although only a single ON/OFF switch 46 is shown, it will be appreciated that it is representative of multiple, interlocking switches so that relay 43 may be energized/de-energized from a local or remote location, such as an ON/OFF switch on the welding torch.

The other end of resistance bar 25 is connected by conductor 42 to one contact of a normally open pair of contacts in relay 43. The other contact of relay 43 is connected by conductor 44 to four snubber circuits 50a-50d, six power transistor circuits 55a-55f, and arc-sustaining resistor 45. The other end of the snubber circuits 50a-50d, of the power transistor circuits 55a-55f, and of arc-sustaining resistor 45 are connected by conductor 41 to the cathode of diode 61, one end of inductor 62, and the return output of shutdown driver 37. The other end of inductor 62 is connected by conductor 63 to one end of resistor 64 and one input of overcurrent detector circuit 73. The other end of resistor 64 is connected by conductor 65 to the other input of overcurrent detector circuit 73, one end of resistor 66, and the MIG & PULSE stud 18. The other end of resistor 66 is connected by conductor 67 to one end of inductor 70. The other end of inductor 70 is connected by conductor 71 to the STICK & TIG stud 17, one input of the high/low voltage switchover circuit 86, one end of 44 ohm resistor 93 and the input of short circuit detector circuit 72. Inductor 62 and resistor 64 provide regulation and smoothing of the output for MIG & PULSE welding. Inductor 70 and resistor 66 provide the additional output smoothing required for STICK & TIG welding. The other end of resistor 93 is connected to 80 v return conductor 23 which is the ground for power supply 11 (FIG. 1). Resistor 93 has two tap points which are connected by conductors 91 and 94 to two of the inputs of high/low voltage switchover circuit 86. Resistor 93 provides a minimum, stabilizing load for transistors 56a–56f when the weld selector station 16 is on but the welder has not yet struck an arc.

Resistance bar 25 has several tap points. The first and second tap points are connected by conductors 26 and 27 to the positive and negative inputs, respectively, of STICK & TIG control circuit 30. The third and fourth tap points are connected by conductor 76 and 77 to the positive and negative inputs, respectively, of peak current detector circuit 80.

The output of STICK & TIG control circuit 30 is connected by conductor 31 to one input of high frequency pulsewidth modulator 34. The output of low frequency pulsewidth modulator 34 is connected by conductor 33 to the other input of high frequency pulsewidth modulator 34. The positive and negative outputs of high frequency pulsewidth modulator 34 are connected by conductors 35 and 36 to a first positive and a first negative input, respectively, of switching, shutdown and driver circuit 37.

The outputs of overcurrent detector circuit 73 and short circuit detector 72 are connected by conductor 74 to one input of peak current detector 80. The output of peak current detector 80 is connected by conductor 81 to a second positive input of switching, shutdown and driver circuit 37. The common reference of overcurrent detector 73, short circuit detector 72, and peak current detector 80 are connected by conductor 75 to the second negative input of switching, shutdown and driver circuit 37.

The driver output and the reference output of switching, shutdown and driver circuit 37 are connected by conductors 40 and 41 to the driver input and reference input of power transistor circuits 55a–55f, respectively.

The circuit power supplies 38 provide the following output voltage to other circuits of the weld selector station: ±14, ±7, ±15, ±66.7, ±1.0.

Arc-sustaining resistor 45 has one tap point which is connected by conductor 82 to one input of high/low voltage switchover circuit 86.

One end and the wiper of potentiometer 84 are connected by conductor 83 to a second input of high/low voltage switchover circuit 86. The other end of potentiometer 84 is connected by conductor 85 to a third input of switchover circuit 86. The speed control outputs of switchover circuit 86 are connected by conductors 95 and 96 to the speed control inputs of feeder control 99. The feeder power outputs of switchover circuit 86 are connected by conductors 95 and 96 to the feeder power inputs of feeder control 99.

Power transistor circuits 55a–55f are identical and each contain a transistor 56 and an emitter resistor 57. The collector of transistor 56 is connected to conductor 44. The emitter of transistor 56a is connected to conductor 41 through resistor 57a. The base of transistor 56a is connected to conductor 40.

Power transistors 56a–56f are each rated at 350 volts and 100 amps continuous. Although six NPN transistors 56a–56f are shown, it will be appreciated that the number of transistors 56 required will be dependent upon the maximum weld current desired and the ratings of the individual transistor. It will also be appreciated that PNP transistors, field effect transistors (FET), or other semiconductor devices can also be used. At present, bipolar transistors are preferred because of their higher ratings and lower cost.

Each power transistor 56 has an emitter resistor 57 valued at 0.55 ohms. It will be appreciated that the purpose of resistor 57 is to prevent current-hogging and destructive thermal runaway by any of the parallel transistors 56. It will also be appreciated that FET's have a positive resistance-temperature coefficient and do not suffer from the same type of current hogging. Therefore, emitter resistors 57 would not be required if transistors 57 were an FET. However, the performance of paralleled FET's can suffer somewhat due to slightly differing gate characteristics. Therefore, if FET's are used for transistor 57 a resistor should be placed in series with the gate of each FET. The value of the resistor will be dependent upon the gate characteristics of the particular FET used.

The four snubber circuits 50a–50d are identical. Snubber 50a contains an 8 microfarad capacitor 51a with one end connected by conductor 52a to the anode of a fast recovery diode 53a and one end of a 0.25 ohm resistor 54a. The other end of capacitor 51a is connected to conductor 44. The cathode of diode 53a and the other end of resistor 54a are connected to conductor 41. Snubbers 50a–50d protect power transistors 56a–56f from switching transients. It should be noted that the values for capacitor 51a and resistor 54a are not the values that would be obtained by the use of standard snubber circuit design equations and tables because of the presence of arc-sustaining resistor 45.

As will be explained in detail below, power transistors 56a–56f are switched on and off at a rapid rate. It will therefore be appreciated that when transistors 56a–56f are off, there will be no current to sustain the welding arc and the arc will be quenched. This undesirable condition is prevented by arc-sustaining resistor 45 connected between conductors 44 and 41. Resistor 45 has a value of 2.4 ohms, which will pass sufficient current to keep the welding arc alive for a short period while transistors 56a–56f are off. When transistors 56a–56f are on, the voltage across resistor 45 will be reduced to a low value and the current supplied by resistor 45 will be negligible compared to the current conducted through transistors 56a–56f.

Arc sustaining resistor 45 also provides an additional benefit. Assume for a moment that arc sustaining resistor 45 is not present, and that transistor 56a develops a short. When driver 37 turns off transistors 56b–56f, the full load current will flow through transistor 56a which will, in most cases, cause it to burn out and permanently become an open circuit. When driver 37 turns transistors 56b–56f on again, they will have to also pass the current that should have been passed by transistor 56a. This extra current may cause transistor 56b to fail shorted, then opened, and so on in a chain reaction until all six transistors have failed in the open mode.

Now insert resistor 45. If transistor 56a develops a short, then when driver 37 turns off transistors 56b–56f, the load current will be partially absorbed by resistor 45. This prevents transistor 56a from opening and therefore prevents the chain reaction from occurring. Resistor 45 thus causes shorted transistor 56a to stay shorted, instead of opening, and preserves transistors 56b-56f.

Of course, if transistor 56a shorts, the weld selector station 16 will not operate properly, but the cost of repair will be reduced.

Assume that transistors 56a-56f are on, that the welding equipment is connected to the STICK & TIG stud 17, and that welding is in progress so that current is flowing through inductors 62 and 70 and resistors 64 and 66. It will be appreciated that inductors 62 and 70 will oppose any rapid change in current.

Free wheeling diode 61, conductor 23, and fuse 24 therefore provide a path so that, when transistors 56a-56f turn off, the current through inductors 62 and 70 will decrease gradually instead of instantaneously, thereby preventing a large negative voltage from appearing on the emitter of transistors 56a-56f. The decay rate of the current will be determined primarily by the values of inductors 62 and 70, resistors 64 and 65, and the inherent resistance, inductance, and capacitance of the welding equipment and the arc.

Free wheeling diode 61 also protects the weld selector 16 from the application of a negative voltage to studs 17 and 18. If a negative voltage is applied to studs 17 or 18, a large current will flow through resistor 64, inductor 62, diode 61, conductor 23, and fuse 24. Fuse 24 is rated at 150 amps. The large current flow will blow fuse 24, thereby isolating and protecting the circuitry in weld selector 16.

Weld selector station 16 has three current limiting circuits: peak current detector 80, overcurrent detector 73, and short circuit detector 72. These current limiting circuits are explained in detail below. The peak current detector 80 causes switching, shutdown and driver circuit 37 to momentarily turn off transistors 56a-56f if the instantaneous current exceeds 2000 amps.

Overcurrent detector 73 causes driver circuit 37 to turn off transistors 56a-56f if the average current exceeds 300 amps for more than one second. Short circuit detector 72 causes driver circuit 37 to turn off transistors 56a-56f if the average voltage on studs 17 or 18 drops below approximately 4 volts. It will be appreciated that overcurrent detector 73 and short circuit detector 72 interact. Assume that a low value resistance is placed across either stud 17 or 18 and stud 19 so that an average current greater than 300 amps flows out of stud 17 or 18. The overcurrent detector 73 will cause transistors 56a-56f to be turned off. The current will then drop and, the voltage between stud 17 or 18 and stud 19 will drop to a low value. Short circuit detector 72 will then keep transistors 56a-56f in the off state until the low value resistance is removed.

The circuit power supplies 38 provides ±14 VDC, ±7 VDC, and +15 VDC, each with an isolated return, and also provides +66.7 VDC and +1.0 VDC, both having conductor 23 as a common return. Power supplies 38 is described in detail below.

Switching, shutdown and driver circuit 37 is controlled by current detectors 72, 73 and 80, pulsewidth modulators 32 and 34, and STICK & TIG control circuit 30. Driver circuit 37 turns transistors 56a-56f on and off, as required. The operation of driver circuit 37 is described in detail below.

It will be appreciated that different types of welding require different voltage/current characteristics. The STICK & TIG mode of welding is best performed with a constant current source.

STICK & TIG control circuit 30 senses and compensates for the current flowing through resistance bar 25 so that, if the STICK & TIG mode is selected, weld selector station 16 will approximate a constant current source.

If the STICK & TIG control circuit 30 is not selected, weld selector 16 and stud 18 approximate a constant voltage source, which is preferred for MIG & PULSE type welding.

As previously described, weld selector station 16 is a switching power supply, with a selectable switching frequency of 10 to 1500 Hz. It will be appreciated that the type of welding and the welding gas and materials used require different switching frequencies, waveforms, and voltage-current characteristics for best performance. Pulsewidth modulators 32 and 34 allow the welder to select these parameters. Both modulators 32 and 34, contain circuitry which increases the output pulsewidth if the input voltage, VIN, on conductor 14 decreases, so that the energy supplied to the weld remains approximately constant over a large (30 volts to 150 volts) range of input voltage VIN.

Low frequency modulator 32 provides an output signal with a range of 10 to 400 Hz. High frequency modulator 34 provides an output signal with a range of 400 to 1500 Hz. The outputs of modulators 32 and 34 can also be combined to provide a low frequency (5 to 400 Hz) output which is chopped at a high frequency (400 to 1500 Hz). This chopping action prevents inductors 62 and 70 from saturating, thereby improving the output regulation provided by them. The output of either modulator 32 or 34 can be combined with the output of STICK & TIG control circuit 30 to provide a pulsed constant current source. In the preferred embodiment, only one or two of the circuits 30, 32 and 34 can be activated at any one time.

The feeder control circuit 99 controls the speed at which the welding material is fed (inched) into the weld. Two commonly used feeder control circuits are the arc voltage feeder, which typically requires approximately 20 to 40 volts, and the DC controlled feeder, which typically requires approximately 30 to 50 volts. High/low voltage switchover circuit 86 automatically selects the voltage on one of conductors 71, 82, 91 and 94 to maintain the proper operating voltage for feeder control circuit 99.

A typical feeder control circuit 99 will also have a potentiometer for varying the rate at which the welding material is inched into the weld. However, it will be appreciated that the welder will desire a much lower inch feed speed when he is adjusting the extended length of the welding material than the inch feed speed desired during welding. High/low voltage switchover circuit 86 automatically switches the inch feed speed from the higher rate during welding to a lower rate when welding is not actually being performed.

Figure 3:
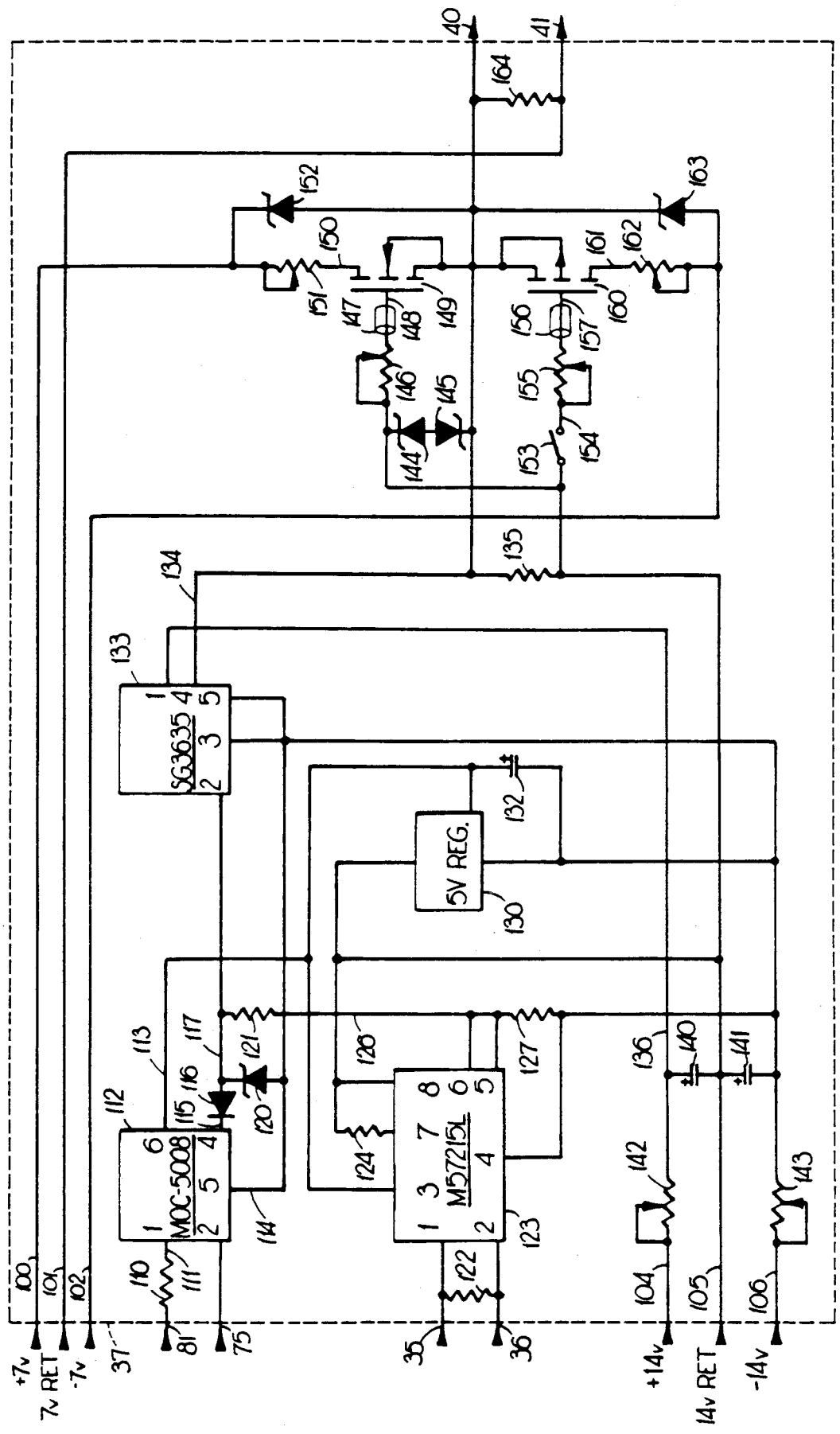
FIG. 3 is a schematic diagram of the switching and shutdown driver of the preferred embodiment.

Turn now to FIG. 3, which is a schematic diagram of the switching, shutdown and driver circuit 37. Driver circuit 37 receives +7 volts on conductor 100 and −7 volts on conductor 102, both referenced to a 7 v return conductor 101, and receives +14 volts on conductor 104 and −14 volts on conductor 106, both referenced to a 14 v return conductor 105.

A first positive input of driver 37 is connected to conductor 35, and the first negative input to a first signal return conductor 36. The second positive input of driver 37 is connected to conductor 81, and the second negative input to a second signal return conductor 75.

The output of driver 37 is connected to conductor 40, referenced to output return conductor 41. Driver 37 may be thought of, in a grossly over-simplified manner, as an electrically isolated two-input AND gate with the second input, conductor 81, being inverted. Therefore, if a logic 0 voltage is present on conductor 35 and/or a logic 1 is present on conductor 81, the output voltage on conductor 40 will be a logic 0, selectable as 0 volts or −6 volts. Conversely, if a logic 1 voltage is present on conductor 35 and a logic 0 is also present on conductor 81, the output voltage on conductor 40 will be a logic 1, approximately +6 volts.

Referring briefly to FIG. 2, it will be seen that conductor 40 is connected to the bases of transistors 56a-56f, and conductor 41 is connected, through resistors 57a-57f, to the emitters of transistors 56a-56f. Therefore, a logic 1 (+6 volts) on conductor 40 will turn on transistors 56a-56f, and a logic 0 will turn off transistors 56a-56f. It will be appreciated that the stored charge in the bases of transistors 56a-56f will have a substantial effect on their turnoff time. Some types of welding require that the turnoff be rapid, whereas other types of welding require a longer turnoff time. As will be shown below, driver 37 has a selectable logic 0 output of 0 volts, which provides a longer turnoff time, or −6 volts, which rapidly sweeps away the base charge and provides a rapid turnoff time.

Going back to FIG. 3, input signal conductor 81 is connected through current limiting resistor 110 and conductor 111 to the anode (PIN 1) of the LED of isolator 112. Signal return conductor 75 is connected to the cathode (PIN 2) of the LED of isolator 112. Isolator 112 is a schmitt-trigger, inverting, open collector optoisolator such as the MOC-5008, manufactured by Motorola, Inc., Phoenix, Ariz. Isolator 112 contains a light emitting diode (LED), a photodetector, a schmitt-trigger, and an open collector output transistor. The ground terminal (PIN 5) of isolator 112 is connected to the negative supply conductor 114. The VCC terminal (PIN 6) of isolator 112 is connected to the output of a regulator 130 and the positive terminal of a filter capacitor 132, by conductor 113. The output of regulator 130 is nominally +5 volts with respect to conductor 114 and provides the 5 volt power required for operation of isolator 112. The negative input of regulator 130 and the negative terminal of filter capacitor 132 are connected to the negative supply conductor 114. The positive input of regulator 130 is connected to the 14 V return conductor 105. The operation of regulator 130 is well known to those skilled in the art.

The output (PIN 4) of isolator 112 is connected through the series combination of conductor 115, blocking diode 116, and conductor 117 to the cathode of a 3.6 volt zener diode 120, one end of a resistor 121, and to the enable input (PIN 2) of a half-bridge driver 133. A logic 1 on conductor 81 causes isolator 112 to place a logic 0 on conductor 117.

The anode of zener diode 120 is connected to the negative supply conductor 114. The purpose of zener diode 120 is to assure that the voltage on conductor 117 does not exceed the maximum rated input voltage of half-bridge driver 133.

In the inventor's prototype of the present invention, driver circuit 37 was in close proximity to the power supply circuits 38. It was determined that transistors from the power supply were being coupled into isolator 112, thereby affecting its function. Diode 116 serves to prevent these transients from affecting isolator 112. Diode 116 is a Schottky diode so that the logic 0 voltage provided by isolator 112 on conductor 117 will be within the input voltage specification for half-bridge driver 133.

Conductor 35 is connected to one end of a loading resistor 122 and to the anode (PIN 1) of the LED of isolator 123. Signal return conductor 36 is connected to the other end of resistor 122 and to the cathode (PIN 2) of the LED of isolator 123. Isolator 123 is an optoisolator with two out-of-phase output transistors such as the M57215L, manufactured by Mitsubishi Electric Company, Tokyo, Japan. The ground terminal (PIN 4) of isolator 123 is connected to the negative supply conductor 114. The first VCC terminal (PIN 3) is connected to the +5 volt output of regulator 130 by conductor 113. The second VCC terminal (PIN 8) is connected to the 14 v return conductor 105.

The collector of the first output transistor (PIN 7) is connected to the 14 v return conductor 105 through current limiting resistor 124. The emitter of the first output transistor (PIN 6) and the collector of the second output transistor (PIN 5) are connected together, to the other end of resistor 121, and to one end of pulldown resistor 127 by conductor 126. The other end of resistor 127 is connected to the negative supply conductor 114. A logic 0 on conductor 35 turns off the first output transistor and turns on the second output transistor of isolator 123, thereby placing a logic 0 on conductor 126.

Since isolator 112 has an open collector output it can only place either a logic 0 or an open circuit onto conductor 117. However, isolator 123 can place a logic 0 or a logic 1 onto conductor 126. It will therefore be appreciated that if the voltage on conductor 35 corresponds to a logic 0 and/or the voltage on conductor 81 corresponds to a logic 1 the voltage on conductor 117 will correspond to a logic 0. Likewise, if the voltage on conductor 35 corresponds to a logic 1 and the voltage on conductor 81 corresponds to a logic 0, the voltage on conductor 117 will correspond to a logic 1.

As previously stated, conductor 117 is connected to the enable input (PIN 2) of a half-bridge driver 133 such as the SG3635A manufactured by Silicon General, Garden Grove, Calif. The pulse input (PIN 5) and the ground terminal (PIN 3) of driver 133 are connected to negative supply conductor 114. The VCC input (PIN 1) of driver 133 is connected to positive supply conductor 136. Driver 133, as configured, functions as a voltage-shifting inverter.

The output (PIN 4) of driver 133 is connected by conductor 134 to one end of a 3.3 kilohm load resistor 135, the cathode of 15 volt zener diode 145, the cathode of 20 volt zener diode 163, the anode of 20 volt zener diode 152, the source of transistors 149 and 160, one end of a 25 ohm load resistor 164, and output signal conductor 40. The 14 v return conductor 105 is connected to the other end of resistor 135, to one end of switch 153, to the cathode of 15 volt zener diode 144 and to the wiper and one end of 400 ohm potentiometer 146. The anode of zener diode 144 is connected to the anode of zener diode 145. Zener diodes 144 and 145 assure that the voltage on conductor 134 does not exceed the gate-to-source voltage of transistors 149 and 160. The other end of potentiometer 146 is connected to the gate of transistor 149 by conductor 148 through a damping ferrite bead 147. The other end of switch 153 is connected by conductor 154 to the wiper and one end of 400 ohm potentiometer 155. The other end of potentiometer 155 is connected to the gate of transistor 160 by conductor 157 through damping ferrite bead 156.

The drain of transistor 149 is connected to one end of a 0.425 ohm potentiometer 151 by conductor 150. The wiper and other end of potentiometer 151 and the cathode of zener diode 152 are connected to the +7 volt conductor 100. The drain of transistor 160 is connected to one end of a 0.05 ohm potentiometer 162 by conductor 161. The wiper and other end of potentiometer 162 and the cathode of zener diode 163 are connected to the −7 volt conductor 102. The 7 v return conductor 101 is connected to the other end of resistor 164 and the output signal return conductor 41. Diodes 152 and 163 limit the drain-to-source voltage on transistors 149 and 160, respectively.

Transistor 149 is an N-channel enhancement mode power MOSFET such as the IRF250 manufactured by International Rectifier Corporation, Los Angeles, Calif. Transistor 160 is a P-channel enhancement mode power MOSFET such as the IRF9130, also manufactured by International Rectifier Corporation. As configured, transistors 149 and 160 function as a power inverter.

Assume that the voltage at the enable input of half-bridge driver 133 corresponds to a logic 1; driver 133 will place approximately −14 volts on conductor 134 with respect to conductor 105. This turns on transistor 149 and turns off transistor 160, thereby placing approximately +6 volts on conductor 41 with respect to conductor 41. It will be appreciated that this turns on transistors 56a–56f of FIG. 2.

Assume now that the voltage at the enable input of driver 133 corresponds to a logic 0; driver 133 will place approximately +14 volts onto conductor 134 with respect to conductor 105. Assume also that switch 153 is closed. This turns off transistor 149 and turns on transistor 160, thereby placing approximately −6 volts on conductor 40 with respect to conductor 41. It will be appreciated that this rapidly turns off transistors 56a–56f of FIG. 2 by rapidly sweeping away any stored base charge. However, if switch 153 is open, then both transistors 149 and 160 will be turned off, thereby placing 0 volts on conductor 40 with respect to conductor 41. It will be appreciated that this will turn off transistors 56a–56f of FIG. 2, but at a slower rate since the stored base charge decays at a slower rate.

The negative supply conductor 114 is connected to the negative end of capacitor 141 and to one end of potentiometer 143. The wiper and the other end of potentiometer 143 are connected to the −14 volt supply conductor 106. The positive supply conductor 136 is connected to the positive end of capacitor 140 and to one end of potentiometer 142. The wiper and other end of potentiometer 142 are connected to the +14 volt supply conductor 104. The other ends of capacitors 140 and 141 are connected to the 14 v return conductor 105.

It will be appreciated that potentiometers 142 and 143 vary the maximum positive and negative voltage, respectively, that driver 133 places on conductor 134 and therefore vary the on-resistance of transistors 160 and 149, respectively.

It will be noted that transistors 160 and 149 have a gate-to-source input capacitance of approximately 2000 picofarads. It will be appreciated that potentiometers 155 and 146 vary the rate at which this capacitance can be charged or discharged and therefore vary the rate at which transistors 160 and 149, respectively, turn on and off.

Potentiometers 151 and 162, which are in series with the drain of transistors 149 and 160, respectively, vary the maximum current available to turn transistors 56a–56f of FIG. 2 on and off, respectively.

It will therefore be appreciated that potentiometers 142, 143, 146, 155, 151 and 162, and switch 153 allow the user to vary the switching characteristics of transistors 56a–56f to obtain the arc characteristics desired for the type of welding being done.

Returning to FIG. 2, switching, shutdown and driver circuit 37 is therefore controlled by the outputs on current detectors 72, 73 and 80 on conductors 81 and 75, and by the output of pulse modulator 34 on conductors 35 and 36.

Resistor 164 provides additional loading for transistors 149 and 160 and circuit power supplies 38 so that the output voltage on conductor 40, with respect to conductor 41, does not exceed the allowable base-emitter voltage of transistors 56a–56f of FIG. 2.

Figure 4:
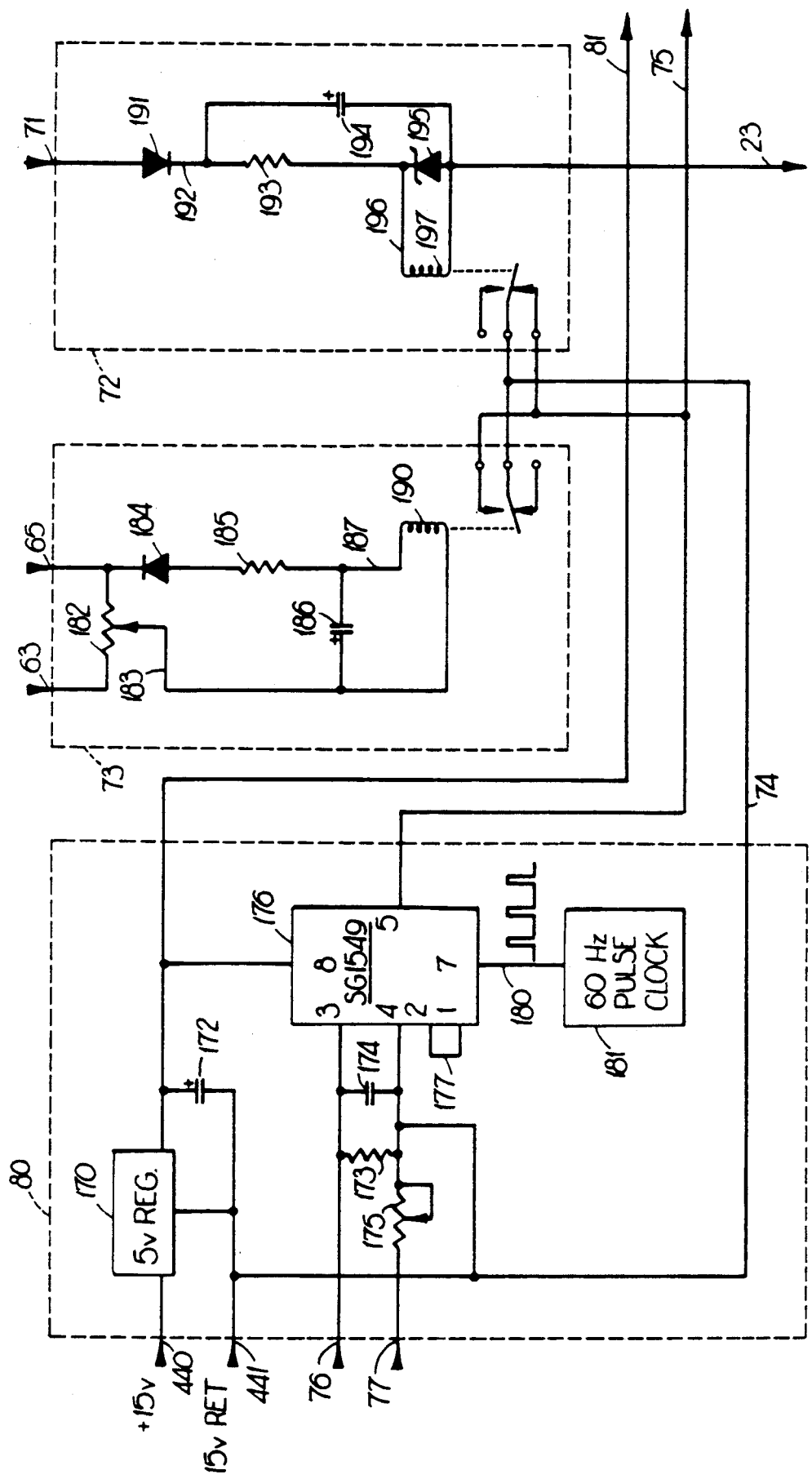
FIG. 4 is a schematic diagram of the current detection circuits of the preferred embodiment.

Turn now to FIG. 4, which is a schematic diagram of peak current detector 80, overcurrent detector 73, and short circuit detector 72. Referring briefly to FIG. 2, peak current detector 80 causes driver circuit 37 to turn off transistors 56a–56f whenever the current through resistance bar 25 exceeds the maximum rated peak current for paralleled transistor 56a–56f. In the preferred embodiment, the allowable peak current is 2000 amps. Regulator 170 steps the +15 volts present on conductor 440 down to +5 volts. The ground of regulator 170 is connected to the 15 v return conductor 441. The output of regulator 170 is connected to a filter capacitor 172, the VCC terminal (PIN 8) of current sense latch 176 and the driver circuit input (FIG. 2) by conductor 81.

Current sense latch 176 is a latching comparator with a low, 0.1 volt, threshold, such as the SG1549 manufactured by Silicon General, Garden Grove, Calif. The "HI CM" inputs (PINS 1 and 2) are not used and are connected to each other by conductor 177. Current signal input conductor 76 is connected to one end of 47 ohm resistor 173, one end of capacitor 174, and to the "LO CM +" input (PIN 3) of latch 176. The current signal return conductor 77 is connected to one end of a 500 ohm potentiometer 175. The wiper and the other end of potentiometer 175 are connected by the 15 v return conductor 441 to the other end of resistor 173, the other end of 0.02 microfarad capacitor 174, and the "LO CM −"/ground (PIN 4) of latch 176. Resistor 173 and potentiometer 175 form a variable voltage divider for calibrating the peak current trip level. Capacitor 174 filters out high frequency noise.

The open collector output (PIN 5) of latch 176 is connected to conductor 75. Therefore, when the input voltage (PIN 3) exceeds approximately 0.1 volt with respect to conductor 441, conductor 75 will be shorted to conductor 441. Since conductor 81 is connected to the +5 volt output of regulator 170, conductor 81 will be at +5 volts (a logic 1) with respect to conductor 75. As previously discussed, a logic 1 on conductor 81 will cause driver 37 to turn off transistors 56a–56f (FIG. 2).

Referring again to FIG. 2, the current through transistors 56a–56f also flows through resistance bar 25 and develops a voltage drop across resistance bar 25. Conductors 76 and 77 present a portion of this voltage to latch 176. The value of resistance bar 25 between conductors 76 and 77 is approximately 0.1 volt/2000 amps=50 microohms. When 2000 amps flows through transistors 56a–56f, the voltage between conductors 76 and 77 will be approximately 0.1 volts, thus setting latch 176 (FIG. 4) and turning off transistors 56a–56f. It will be appreciated that a latching device was chosen for device 176 so that a well-defined shutdown of transistors 56a–56f occurs when the peak current rating is exceeded. If a latch was not used for device 176 then, when the peak current exceeded the safe value, transistors 56a–56f would be turned off; this would cause the current to quickly drop below the safe value, which would cause transistors 56a–56f to turn back on again, causing the current to quickly rise above the safe value. The net result would be a high frequency oscillation with an average current, instead of a peak current, of 2000 amps.

Turning back to FIG. 4, since device 176 is a latch there must be a means to reset it. Although a manual reset could be used, an automatic reset is preferable. The output of pulse clock 181 is connected by conductor 180 to the reset input (PIN 7) of latch 176. In the preferred embodiment of the present invention pulse clock 181 has a frequency of 60 Hz. The frequency of pulse clock 181 is not critical but should be fast enough to allow welding to continue without a noticeable delay. The period of the pulse is not critical, but must be at least 150 microseconds for latch 176 specified to be reset.

Referring briefly to FIG. 2, short circuit detector 72 monitors the voltage on STICK & TIG stud 17 and, through resistor 66 and inductor 70, the voltage on MIG & PULSE stud 18. If the voltage on stud 17 or 18 drops below a predetermined trip voltage because of a short circuit or because overcurrent detector 73 has tripped, short circuit detector 72 causes switching, shutdown and driver circuit 37 to turn off transistors 56a–56f. Short circuit detector 72 will then keep transistors 56a–56f off until the short is removed and the voltage at studs 17 and 18 rises above the trip voltage.

Since transistors 56a–56f are now off, they cannot raise the voltage on studs 17 and 18, even after the short is removed. The restart voltage is provided by the 2.4 ohm arc sustaining resistor 45. It will be appreciated that resistor 45 cannot pass sufficient current to raise the voltage at studs 17 and 18 until the short circuit is removed. Once the short circuit is removed, resistor 45 will pull studs 17 and 18 above the trip voltage and short circuit detector 37 will allow driver circuit 37 to turn on transistors 56a–56f so that welding can start again.

Although the input of short circuit detector 72 is shown connected to the STICK & TIG stud 17, it will be appreciated that the input may be connected to any point in the circuit that will have a low voltage when stud 17 or 18 is shorted. Two of the most likely other points are MIG & PULSE stud 18, and conductor 67 between resistor 66 and inductor 70.

Turning back to FIG. 4, conductor 71 is connected to the anode of blocking diode 191. The cathode of blocking diode 101 is connected by conductor 192 to one end of 500 ohm resistor 193 and to the positive terminal of 680 microfarad capacitor 194. Diode 191 allows capacitor 194 to charge, but not to discharge, through conductor 71. The other end of resistor 193 is connected by conductor 196 to one end of the 12 volt, 400 ohm coil of relay 197 and to the cathode of 15 volt zener diode 195. The other end of the coil of relay 197, the anode of zener diode 195, and the negative terminal of capacitor 194 are connected to the 80 v return conductor 23.

Since the coil of relay 197 is rated at 12 volts and the voltage on conductor 71 can be 80 volts or more, resistor 193 and zener diode 195 serve to limit the voltage on the coil of relay 197.

During normal welding the voltage on conductor 71 will be sufficient to keep relay 197 energized. However, if stud 17 and/or stud 18 are shorted to stud 19, the voltage on conductor 71 will be inadequate to keep relay 197 energized. Capacitor 194 serves as a holding capacitor to keep relay 197 energized for a short period of time. This prevents short circuit detector 72 from detecting brief shorts. During a brief short, peak current detector 80 provides protection.

If a prolonged short occurs, capacitor 174 will discharge through resistor 193, diode 195, and the coil of relay 197, and relay 197 will be de-energized.

Relay 197 has a pair of normally closed contacts. If a short is not present, the voltage on conductor 71 will be adequate to keep relay 197 energized, and the contacts will be open. If a prolonged short occurs, relay 197 will drop out and the contacts of relay 197 will close. One contact is connected to 15 v conductor 441 and the other contact is connected to conductor 75.

When a prolonged short occurs, relay 197 will drop out, the contacts will close, and conductor 75 will be connected to conductor 441. Conductor 81 will therefore be at +5 volts (a logic 1) with respect to conductor 75. As previously described, a logic 1 on conductor 81 causes driver circuit 37 (FIG. 2) to turn off transistors 56a–56f (FIG. 2).

This condition will remain until, as described above, the short is removed and the voltage on studs 17 and 18 rises above the trip voltage.

Returning briefly to FIG. 2, overcurrent detector 73 monitors the current flowing through transistors 56a–56f and turns them off when the average current exceeds the maximum rated average current of transistors 56a–56f. In the preferred embodiment of the present invention, overcurrent detector 73 is set to trip at 250 to 300 amps. Assuming that the current flow is 300 amps, then there will be approximately 0.03 ohms × 300 amps=9 volts developed across resistor 64. This voltage is presented to overcurrent detector 73 by conductors 63 and 65.

Turning now to FIG. 4, conductor 63 is connected to one end of 25 ohm potentiometer 182. The wiper of potentiometer 182 is connected by conductor 183 to the positive end of 4700 microfarad capacitor 186 and to one end of the 400 ohm coil of relay 190. Conductor 65 is connected to the other end of potentiometer 182 and, through the series combination of diode 184, 47 ohm resistor 185, and conductor 187, to the other end of capacitor 186 and the other end of the coil of relay 198.

The voltage placed between conductors 63 and 65 will, when the current exceeds the trip value, cause relay 190 to pull in. Potentiometer 182 allows the trip point to be set to match the average current ratings of transistor 56a–56f (FIG. 2). Resistor 185 is a current limiting resistor and diode 184 prevents capacitor 186 from discharging through potentiometer 182 and resistor 64.

One contact of a pair of normally open contacts in relay 190 is connected to conductor 75. The other contact in relay 190 is connected to the 15 v return conductor 441. When the current flowing through transistors 56a–56f (FIG. 2) is less than the trip value relay 190 will not be energized and the contacts will be open. However, when the current exceeds the trip value, relay 190 will be energized and the contacts of relay 190 will be closed, thereby connecting the 15 v return conductor 441 to conductor 75. This places +5 volts, a logic 1, on conductor 81 with respect to conductor 75 and, as previously described, a logic 1 on conductor 81 causes driver circuit 37 (FIG. 2) to turn off transistors 56a-56f (FIG. 2). The current then falls below the trip value. Capacitor 186 and the resistance of the coil of relay 190 have a time constant of approximately two seconds. This assures that transistors 56a-56f (FIG. 2) are off for a sufficient time to cause the output current and voltage to fall to zero.

Returning to FIG. 2, it will be appreciated that if overcurrent detect 73 is tripped, the current flow will be interrupted for around two seconds. This time period is more than adequate for the voltage on studs 17 and 18 to fall below the trip voltage of short circuit detector 72. Therefore, even after the current falls and overcurrent detector 73 has reset, short circuit detector 72 will keep transistors 56a-56f turned off until the short is removed and resistor 45 pulls the voltage on studs 17 and 18 back above the trip voltage.

Continuing with FIG. 2, STICK/TIG control circuit 30 monitors the current out of studs 17 and 18 and causes weld selector 16 to function as a constant current source. Current flowing out of studs 17 and 18 must flow through resistance bar 25. One of the taps of resistance bar 25 is connected to positive signal conductor 26. Another of the taps of resistance bar 25 is connected to the negative signal conductor 27. Conductors 26 and 27 are connected to the inputs of control circuit 30.

The voltage output of control circuit 30 on conductor 31 increases as the current through resistance bar 25 decreases. This causes pulsewidth modulator 34 to increase the on-time of its output on conductors 35 and 36. This causes driver circuit 30 to increase the on-time of its output on conductors 40 and 41, thereby increasing the on-time of transistors 56a-56f, which increase the output current.

Figure 5:
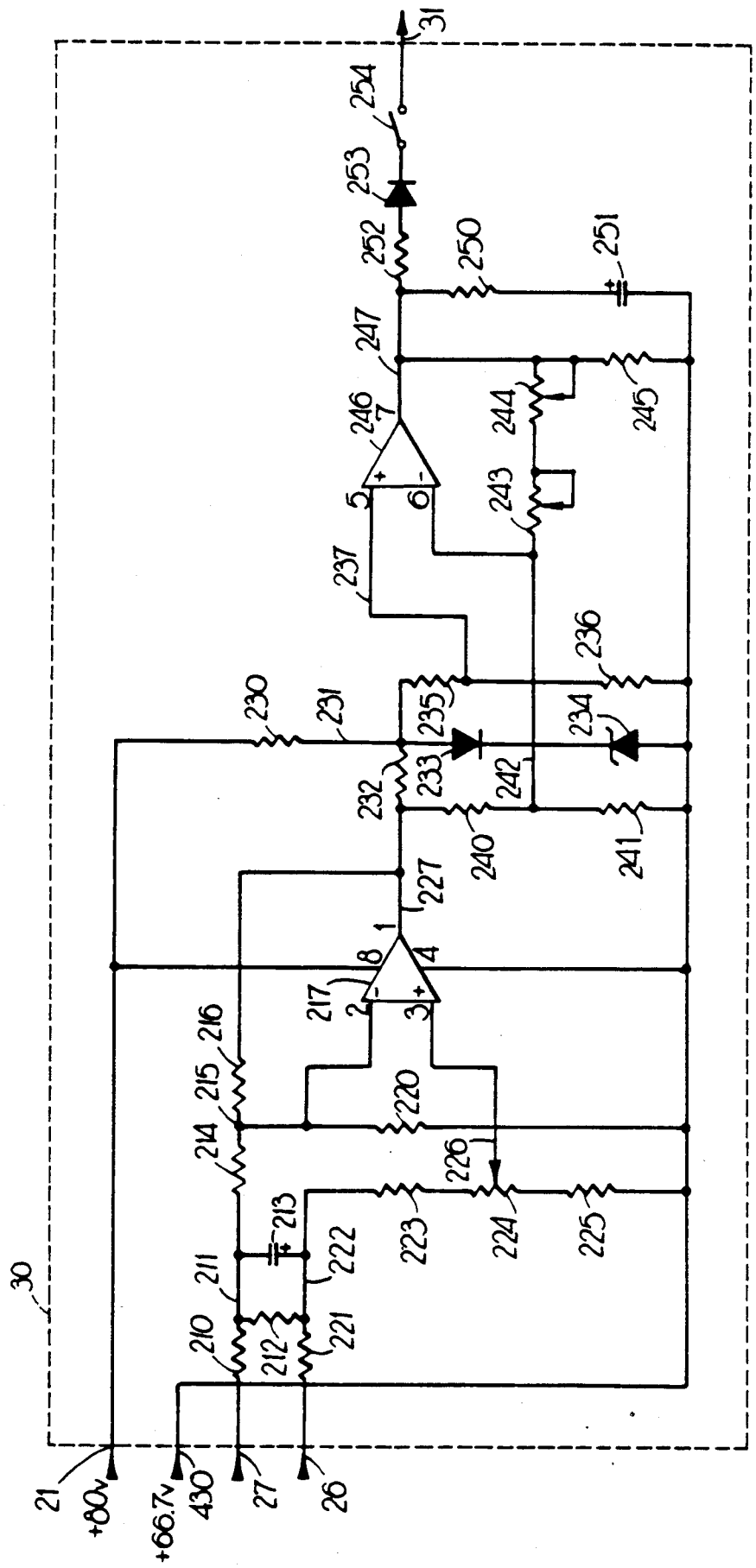
FIG. 5 is a schematic diagram of the STICK & TIG control circuit of the preferred embodiment.

Turn now to FIG. 5, which is a schematic diagram of STICK/TIG control circuit 30. Control circuit 30 is powered by the +13.3 volt difference between +80 volt conductor 21 and +66.7 volt conductor 430, which functions as the circuit ground for control circuit 30. The positive signal conductor 26 is connected to one end of 100 ohm resistor 221. The other end of resistor 221 is connected by conductor 222 to one end of 100 ohm resistor 212, the positive terminal of 100 microfarad capacitor 213, and to one end of 30 kilohm resistor 223. The other end of resistor 223 is connected to one end of 2 kilohm potentiometer 224. The other end of potentiometer 224 is connected through 50 kilohm resistor 225 to circuit ground 430. The wiper of potentiometer 224 is connected by conductor 226 to the non-inverting input of operational amplifier (op-amp) 217.

The negative signal conductor 27 is connected to one end of 100 ohm resistor 210. The other end of resistor 210 is connected by conductor 211 to the other end of resistor 212, the other end of capacitor 213, and to one end of 50 kilohm resistor 214. The other end of resistor 214 is connected by conductor 215 to one end of 500 kilohm feedback resistor 216, the inverting input of op-amp 217, and to one end of 50 kilohm resistor 220. The other end of resistor 216 is connected to the output (PIN 1) of op-amp 217 by conductor 227. The other end of resistor 220 is connected to circuit ground 430.

It will be appreciated that op-amp 217 is configured as a differential-input, negative-feedback gain stage with a gain control potentiometer 224. Capacitor 213 is a smoothing capacitor which eliminates high frequency transients.

The output of op-amp 217 is also connected by conductor 227 to one end of 5.1 kilohm stabilizing resistor 232, and one end of 5.1 kilohm resistor 240. The other end of resistor 240 is connected to circuit ground 430 through 5.1 kilohm resistor 241, and is connected by conductor 242 to the inverting input of op-amp 246 and one end of 30 kilohm potentiometer 243.

The ground input of op-amps 217 and 246 are connected to circuit ground 430. Conductor 21 is connected to the VCC input of op-amps 217 and 246, and one end of 200 ohm resistor 230. The other end of resistor 230 is connected by conductor 231 to the other end of resistor 232, to the anode of temperature compensating diode 233, and one end of 5.1 kilohm resistor 235. The cathode of diode 233 is connected to the cathode of 6.8 volt zener diode 234. The anode of zener diode 234 is connected to circuit ground 430. The other end of resistor 235 is connected to the non-inverting input of op-amp 246 by conductor 237, and connected to circuit ground 430 through 5.1 kilohm resistor 236.

Because of the temperatures encountered in weld selector 16, resistors 214, 216, 220, 223, 225, 232, 235, 236, 240 and 241 should be metal film resistors so that the output of STICK/TIG control circuit 30 will not be overly temperature sensitive.

It will be appreciated that diodes 233 and 234 form a temperature-compensated 7.5 volt reference and that resistors 235 and 236 place one-half of this reference voltage onto the non-inverting input of op-amp 246.

The output of op-amp 246 is connected by conductor 247 to one end and the wiper of 6.8 kilohm current gain limit potentiometer 244, to circuit ground 430 through 6.8 kilohm load resistor 245, to one end of current limiting 10 ohm resistor 250, and to one end of 100 kilohm resistor 252. The other end of limit potentiometer 244 is connected to the wiper and the other end of current gain potentiometer 243. The other end of resistor 250 is connected to circuit ground 430 through 1000 microfarad capacitor 251. The other end of resistor 252 is connected to the anode of blocking diode 253. The cathode of diode 253 is connected to output conductor 31 through switch 254.

Op-amp 246 is configured as a variable gain amplifier with a reference voltage (3.75 volts) connected to the non-inverting input and the output of op-amp 217 connected to the inverting input. The output of op-amp 246 on conductor 247 is therefore proportional to the negative of the differential voltage between input conductors 26 and 27.

Potentiometers 243 and 244 control the gain of op-amp 246. Potentiometer 243 may be set by the welder to obtain the desired arc characteristics. Potentiometer 244 is generally not accessible to the welder and is used to set the minimum gain of amplifier 246.

Capacitor 251 and resistor 250 heavily load the output of op-amp 246 so that the voltage on conductor 247 changes at a relatively slow rate. This assures that the output of control circuit 30 is responsive to those variations in the welding current caused by welding conditions and not responsive to those variations caused by the normal operation of pulsewidth modulators 32 and 34.

Returning briefly to FIG. 2, modulator 32 is a low frequency pulsewidth modulator. In the preferred embodiment, the pulse frequency is variable from approximately 10 to 400 Hz, and the duty cycle is variable from 0 to over 90 percent. These values are not critical but do allow the welder considerable latitude for obtaining the most desirable arc characteristics.

Modulator 32 is input voltage compensated. The pulsewidth increases as the input voltage on conductor 21 decreases so that the average power delivered to the weld is unaffected by input voltage variations.

Figure 6:
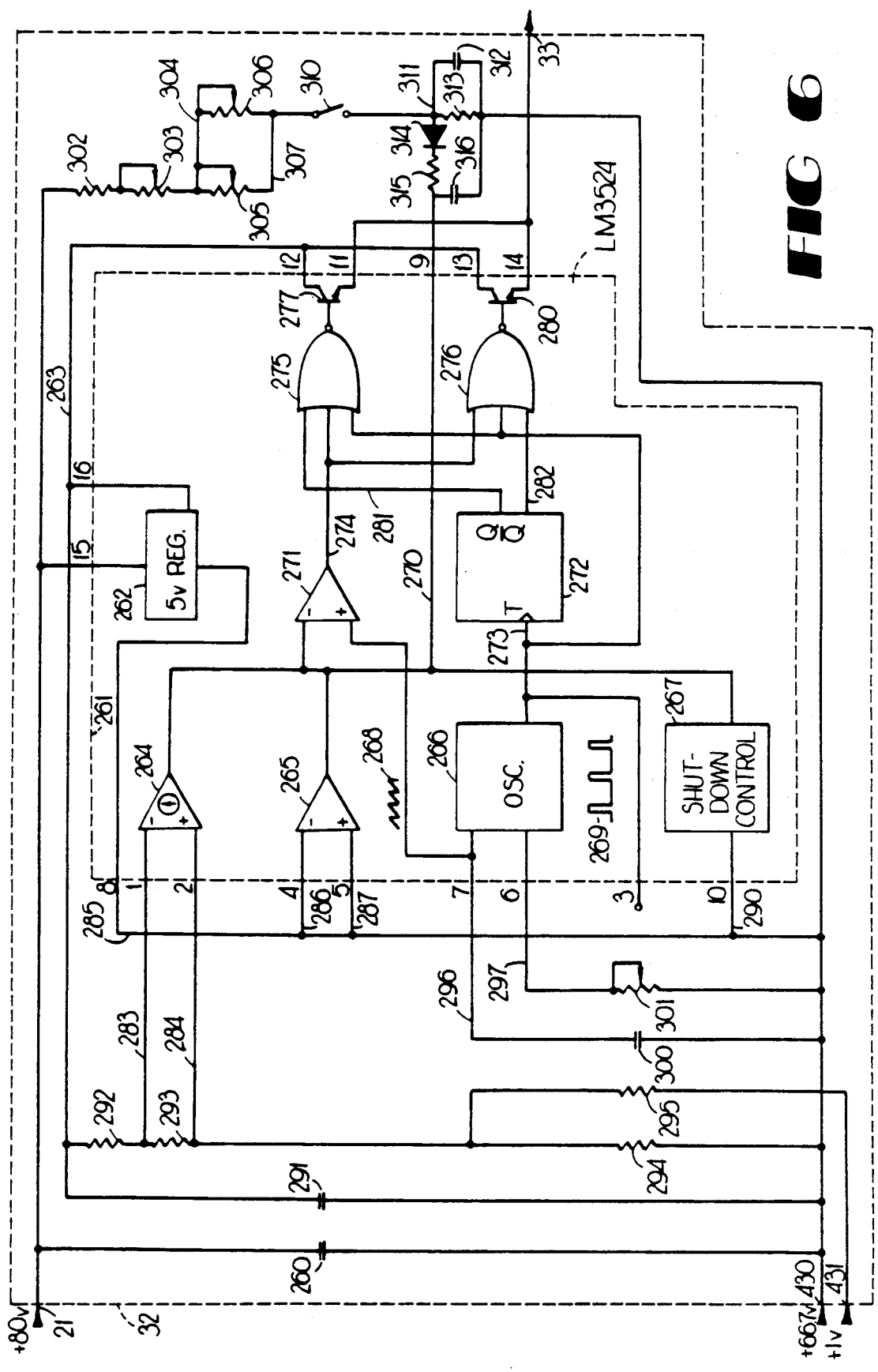
FIG. 6 is a schematic diagram of the low frequency pulsewidth modulator of the preferred embodiment.

Turn now to FIG. 6, which is a schematic diagram of low frequency pulsewidth modulator 32. Modulator 32 is powered by the 13.3 volt difference between +80 volt conductor 21 and +66.7 volt conductor 430, which also serves as the circuit ground. Conductor 21 is connected to 0.1 microfarad capacitor 260 and to the VCCIN terminal of modulator 261. Modulator 261 is a regulating pulsewidth modulator such as the LM3524 manufactured by National Semiconductor Corporation, Santa Clara, Calif.

Modulator 261 contains a +5 volt regulator 262, an error transconductance amplifier 264, a current limit amplifier 265, an oscillator 266, a shutdown control 267, a comparator 271, an edge-triggered toggle 272, two 3-input NOR gates 275 and 276, and two NPN output transistors 277 and 280.

The output of transconductance amplifier 264, current limit amplifier 265, and shutdown control 267 are connected to the inverting input of comparator 271 by conductor 270. Current limit amplifier 265 and shutdown control 267 are each able to override the output of transconductance amplifier 264. Current limit amplifier 265 is not used so its inverting input and non-inverting input are connected to circuit ground 430 by conductor 286 and conductor 287, respectively. Shutdown control 67 is also not used so its input is connected to circuit ground 430 by conductor 290.

Regulator 262 steps the +13.3 volts present on conductor 21 (with respect to circuit ground 430) down to +5 volts and places this regulated +5 volts onto conductor 263. This +5 volts also powers some of the internal circuitry of modulator 261. The input of regulator 262 is connected to conductor 21. The ground terminal of modulator 261 is connected by conductor 285 to circuit ground 430.

The output of oscillator 266 is connected by conductor 273 to the toggle input of toggle 272 and one input of NOR gates 275 and 276. The Q output of toggle 272 is connected by conductor 281 to a second input of NOR gate 275. The negated Q output of toggle 272 is connected by conductor 282 to a second input of NOR gate 276. The output of comparator 271 is connected by conductor 274 to the third input of NOR gates 275 and 276. The outputs of NOR gates 275 and 276 are connected to the bases of transistors 277 and 280, respectively. The collectors of transistors 277 and 280 are connected to +5 volt conductor 263. The emitters of transistors 277 and 280 are connected to output signal conductor 33.

The R input of oscillator 266 is connected to circuit ground 430 through the series combination of conductor 297 and 500 kilohm potentiometer 301. The C input of oscillator 266 is connected by conductor 296 to one end of 0.1 microfarad capacitor 300, and the non-inverting input of comparator 271. The other end of capacitor 300 is connected to circuit ground 430. Capacitor 300 and potentiometer 301 determines the frequency of oscillator 266.

The output of oscillator 266 on conductor 273 is a pulsed waveform 269 which, during the pulse period, toggles the toggle 272 and, through NOR gates 275 and 276, turn off transistors 277 and 280, respectively. Oscillator 266 also causes a sawtooth voltage 268 to be present on conductor 296. It will be appreciated that when the voltage on conductor 296 rises above the voltage on conductor 270, the output of comparator 271 will be a logic 1, thereby turning off transistors 277 and 280 through NOR gates 275 and 276, respectively.

The regulated +5 volt conductor 263 is connected to one end of 0.1 microfarad filter capacitor 291 and to one end of 5.1 kilohm resistor 292. The other end of capacitors 260 and 291 are connected to circuit ground 430. The other end of resistor 292 is connected by conductor 283 to the inverting input of transconductance amplifier 264 and one end of 10 ohm resistor 293. The other end of resistor 293 is connected by conductor 284 to the non-inverting input of transconductance amplifier 264, one end of 68 kilohm resistor 294, and one end of 178 kilohm resistor 295. The other end of resistor 294 is connected to circuit ground 430. The other end of resistor 295 is connected to +1 volt conductor 431.

It will be appreciated that resistors 292, 293, 294 and 295 form a voltage divider string which provides the differential voltage input to transconductance amplifier 264. As will be described below, +66.7 volt conductor 430 is regulated at −13.3 volts with respect to +80 volt conductor 21. Neither +80 volt conductor 21 nor +66.7 volt conductor 430 are regulated with respect to +1 volt conductor 431. It will also be appreciated that conductor 283 will always be positive with respect to conductor 284, therefore transconductance amplifier will always be trying to sink, rather than source, current from conductor 270.

Transconductance amplifier 264 has a maximum output of a few hundred microamps. As previously stated, the output of transconductance amplifier 264 is also placed onto conductor 270. Since transconductance amplifier 264 is connected in an open-loop configuration, and since the inverting input is always positive with respect to the non-inverting input, it may be expected that amplifier 264 would drive conductor 270 down to circuit ground 430. However, the input to amplifier 264 is the small voltage (millivolts) developed across 10 ohm resistor 293. This small input voltage, the small output current of amplifier 264, and the 100 kilohm load resistor 315 therefore force amplifier 264 to operate as a linear transconductance amplifier, even when connected in an open loop configuration.

It will be appreciated that the differential voltage across resistor 293 will increase as the voltage on conductors 21 and 430 increases with respect to +1 volt conductor 431. This causes amplifier 264 to sink more current and pulls the voltage on conductor 261 down so as to decrease the width of the output pulses. It will be appreciated that this, in turn, causes the average current through transistors 56a–56f (FIG. 2) to decrease, thereby compensating for the increase in the input voltage on +80 volt conductor 21.

The output of transconductance amplifier 264 is also connected by conductor 270 to one end of 0.1 microfarad capacitor 316 and one end of 100 kilohm resistor 315. The other end of resistor 315 is connected to the cathode of blocking diode 314. The anode of diode 314 is connected by conductor 311 to one end of 12 kilohm resistor 313, one end of 1.0 microfarad capacitor 312, and to one end of switch 310. The other end of capacitors 312 and 316 and the other end of resistor 313 are connected to circuit ground 430.

The other end of switch 310 is connected by conductor 307 to one end of paralleled potentiometers 305 (250 kilohms) and 306 (100 kilohms). The wipers and other ends of potentiometers 305 and 306 are connected by conductor 304 to one end of 25 kilohm potentiometer 303. The wiper and other end of potentiometer 303 are connected to +80 volt conductor 21 through 22 kilohm resistor 302. It will be appreciated that, when switch 310 is closed, resistors 302 and 313 and potentiometers 303, 305, and 306 form an adjustable voltage divider with filtering capacitors 312 and 316 and an output on conductor 270.

Conductor 270 is connected to the inverting input of comparator 271 and sets a reference level. The ramp voltage 268 on conductor 296 starts below the reference level on conductor 270 and so the output of comparator 271 is a logic 0, thus turning on either transistor 277 or 280, depending upon the state of the Q and negated Q outputs of toggle 272. After the voltage on conductor 296 rises above the reference level on conductor 270, the output of comparator 271 is a logic 1, thus turning off both transistors 277 and 280. The voltage on conductor 296 continues rising until it reaches the internal reference level of oscillator 266, at which point oscillator 266 discharges capacitor 296 thus causing the voltage on conductor 296 to fall to zero, and also places a pulse on conductor 273 which toggles the toggle 272 and also keeps transistors 277 and 280 turned off. The voltage on conductor 296 begins rising again and the cycle repeats.

It will now be appreciated that the voltage on conductor 270 sets the width of the output pulses on conductor 33. Potentiometers 303 and 305 are used to set the maximum and minimum pulsewidth points. Potentiometer 306 allows the welder to vary the pulsewidth between the maximum and minimum points to obtain the desired arc characteristics.

If switch 30 is open, conductor 270 will be pulled to circuit ground 430 by amplifier 264, and the output pulsewidth of modulator 261 will drop to zero. Switch 310 therefore serves as the ON/OFF switch for low frequency pulsewidth modulator 32.

Figure 7:
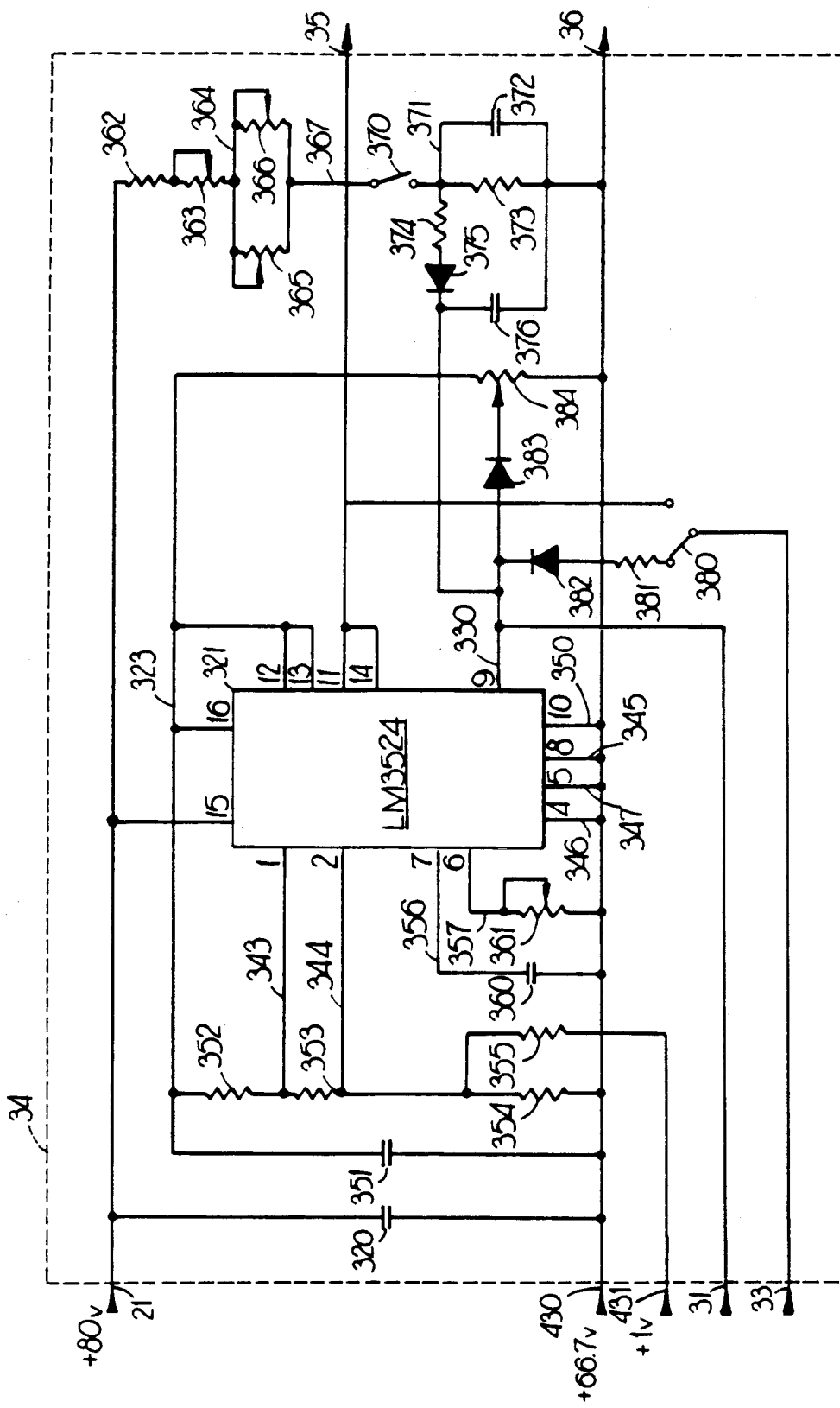
FIG. 7 is a schematic diagram of the high frequency pulsewidth modulator of the preferred embodiment.

Turn now to FIG. 7, which is a schematic diagram of high-frequency pulsewidth modulator 34. With a few exceptions, described below, the operation of high frequency pulsewidth modulator is the same as the operation of low frequency pulsewidth modulator 32 and components 320 through 376 are identical to components 260–316, respectively, of FIG. 6.

In the preferred embodiment the pulse frequency is variable from 400 to 1500 Hz, the duty cycle is variable from 0 to over 90 percent, and pulse frequency potentiometer 361 has a value of 50 kilohms. The frequency range of high frequency pulsewidth modulator 34 is not critical and was selected to provide for anticipated welding needs. However, weld selector station 16 has been successfully tested with modulator 34 frequencies above 50 kHz. One benefit of operation at frequencies substantially in excess of 1500 Hz is that the inductance, and therefore the size, of inductors 62 and 70 may be reduced without adversely affecting the regulating ability of weld selector station 16.

Five volt conductor 323 is connected to circuit ground 430 through 5 kilohm potentiometer 384. The wiper of potentiometer 384 is connected to the cathode of blocking diode 383. The anode of blocking diode 383 is connected to conductor 330. This sets an upper limit on the output pulsewidth and, therefore sets a minimum time during each pulse that the output of modulator 321 is a logic 0. This minimum time is often called the deadband time.

It will be appreciated that this deadband time only affects the maximum possible pulsewidth of the pulses generated by modulator 321 and has no effect upon the maximum pulsewidth of the pulses generated by modulator 261 (FIG. 6) or upon the period between high frequency and low frequency pulses.

The maximum pulsewidth set by potentiometers 363, 365 and 366 is typically below the maximum pulsewidth set by potentiometer 384. Although potentiometer 384 can be used to override the maximum pulsewidth time set by potentiometers 363, 365 and 366, its primary purpose, as described below, is to override the maximum pulsewidth set by the output of STICK/TIG control circuit 30 and/or of low frequency pulsewidth modulator 32. It will be appreciated that the output of high frequency pulsewidth modulator 34 is affected by potentiometers 363, 365 and 366 only if switch 370 is closed.

It will be recalled that the output of STICK/TIG control circuit 30 is a DC voltage responsive to the current through resistance bar 25 (FIG. 2), can pull conductor 31 up, but not down (FIG. 5), and can be placed on (removed from) conductor 31 by closing (opening) switch 254 (FIG. 5). The output of STICK/TIG control circuit 30 is connected by conductor 31 to conductor 330 of high frequency pulsewidth modulator 34.

Assume that switch 254 (FIG. 5) is closed and switch 370 is open. If the output current of weld selector station 16 increases, the current through resistance bar 25 will increase, and the output of STICK/TIG control circuit 30 on conductor 31 will decrease. This lowers the voltage on conductor 330, which causes modulator 321 to decrease the output pulsewidth, causes transistors 56a–56f to have less on time, thereby reducing the current through resistance bar 25. The result is a high-frequency, variable pulsewidth adjustable constant current source.

Diodes 253 (FIG. 5) and 375 form a wired-OR so, if switch 370 is closed, the output of modulator 321 will be the larger of (a) the pulsewidth determined by STICK/TIG control circuit 30 or (b) the pulsewidth determined by potentiometers 363, 365 and 366. If switch 370 is open, the output of modulator 321 will be the pulsewidth determined by STICK/TIG control circuit 30. However, in either case, the maximum output pulsewidth of modulator 321 is determined, as explained above, by the setting of deadband potentiometer 384.

The output of low frequency pulsewidth modulator 32 (FIG. 6) is connected by conductor 33 to the pole contact of SPDT switch 380. It will be recalled that the output of low frequency modulator 32 is a low frequency pulsed output. The first position of switch 380 connects conductor 33 to the anode of blocking diode 382 through 100 kilohm resistor 381. The cathode of diode 382 is connected to conductor 330.

Assume that switch 380 is in the first position, that STICK/TIG switch 254 (FIG. 5) and HIFREQ switch 370 are open, and that LOFREQ switch 310 (FIG. 6) is closed. During the period that the output of low frequency pulsewidth modulator 32 is a logic 0 the output of high frequency pulsewidth modulator 34 will also be a logic 0. During the period that the output of low frequency pulsewidth modulator 32 is a logic 1 the output of high frequency pulsewidth modulator 34 will be a high frequency series of pulses, with the pulsewidth of each pulse being determined by the setting of deadband potentiometer 384. The result is that the output of high frequency modulator 34 will be a repeated series of a burst of high frequency pulses followed by a period of no output pulses. Since both modulators 32 and 34 are input voltage compensated, weld selector station 16 (FIG. 1) approximates a high-frequency, low burst rate, constant voltage source.

Assume now that STICK/TIG switch 254 (FIG. 5) is also closed. When the output of low frequency modulator 32 is a logic 0, the voltage on conductor 330, and therefore the output pulsewidth of high frequency modulator 34, will be determined by the output of STICK/TIG control circuit 30, within the limit set by deadband potentiometer 384. When the output of low frequency modulator 32 is a logic 1, the voltage on conductor 330, and therefore the output pulsewidth of high frequency modulator 34, will be determined by the setting of deadband potentiometer 384. The result is that the output of high frequency modulator 34 will alternate between a first series of high frequency pulses whose width is determined primarily by STICK/TIG control circuit 30, and a second series of high frequency pulses whose width is determined by deadband potentiometer 384. The duration of each series will be determined by low frequency modulator 32. Weld selector station 16 will therefore alternate, at the low frequency rate, between approximating a high pulse frequency, variable pulsewidth, constant current source and a high pulse frequency, fixed pulsewidth, constant voltage source.

Assume that switch 380 is in the second position and that switch 310 (FIG. 6) is closed. Conductor 33 will be connected by switch 380 to conductor 35. It will be recalled that the output of modulator 361 and of modulator 321 can pull up, but not down. Therefore, modulators 261 and 321 are configured in a wired-OR configuration. Also assume that switch 370 and switch 254 (FIG. 5) are open. When the output of low-frequency modulator 32 is a logic 1, the voltage on conductor 35 will be a logic 1. When the output of low frequency modulator 32 is a logic 0, the voltage on conductor 35 will also be a logic 0. The logic state of conductor 35 will therefore follow the logic state of the output of low frequency modulator 32. Weld selector station will therefore approximate an input voltage compensated, low frequency, pulsed voltage source.

Now assume that switch 370 is closed, but switch 254 (FIG. 5) is open. When the output of low frequency modulator 32 is a logic 1, the output on conductor 35 will be a logic 1. When the output of low frequency modulator 32 is a logic 0, the output of modulator 321 dominates, which will be a high frequency pulse whose pulsewidth is determined by setting of potentiometers 363, 365 and 366. The signal conductor 35 will therefore alternate, at the low frequency rate, between a logic 1 and a burst of high frequencies pulses.

Now assume that switch 370 is open and switch 254 (FIG. 5) is closed. During the period that the output of low frequency modulator 32 is a logic 1, the output signal on conductor 35 will be a logic 1. During the period that the output of low frequency modulator is a logic 0, the output signal on conductor 35 will be a high frequency series of pulses provided by modulator 321. It will be recalled that, given the above switch conditions, the width of the output pulses provided by modulator 321 is controlled by STICK/TIG control circuit 30.

The inventor knows of no welding application wherein it would be desirable to have switches 254 (FIG. 5), 310 (FIG. 6) and 370 (FIG. 7) all closed. Therefore, in the preferred embodiment, the operating condition wherein switch 254 (FIG. 5), switch 310 (FIG. 6) and switch 370 (FIG. 7) are all closed is an invalid condition and turns off weld selector station 16. Methods of using mechanical and/or electrical interlocks to prevent the simultaneous closing of all three switches 254, 310, and 370 are well known to those skilled in the art and are not detailed herein. However, some welding application unknown to the inventor may require the closing of all three switches 254, 310 and 370 and therefore it may be desirable to allow this operating condition.

Returning briefly to FIG. 2, high/low voltage switchover circuit 86 performs two functions: switching the speed control input of feeder control 99 from potentiometer 84 to a fixed resistor inside switchover circuit 86; and regulating the power supply voltage provided to feeder control 99.

The welder sets potentiometer 84 to get the desired wire feed speed for the actual welding operation. This wire feed speed is generally higher than the wire feed speed desired when the welder is adjusting the wire feed length prior to commencing the welding operation. Switchover circuit 86 monitors the voltage on studs 17 and 18, which will be high when not welding and low when welding, and connects an internal resistor, or potentiometer 84, respectively, to feeder control 99, thereby automatically providing the more desirable wire feed speed.

A typical feeder control 99 will contain some voltage regulating circuitry so that minor variations in the input voltage do not affect the wire feed speed. The input voltage for a feeder control 99 is also typically obtained by using a resistance voltage divider to drop the +80 volts on conductor 14 down to the specified operating voltage. However, a typical resistive voltage divider may consume over 100 watts of power, which is dissipated as heat. Switchover circuit 86 eliminates this resistive voltage divider, and therefore improves the efficiency of weld selector station 16, by switching between several voltage sources already in weld selector station 16 to obtain the specified operating voltage.

In the preferred embodiment switchover circuit 86 can select from a tap point on arc sustaining resistor 45, STICK & TIG stud 17, or two tap points on load resistor 93. It will be appreciated from prior statements that resistor 45 already exists in weld selector station 16 to provide a sustaining current for the arc when transistors 56a–56f are turned off, and that resistor 93 already exists in weld selector station 16 to provide a minimum load for transistors 56a–56f when they are on but an arc has not been struck.

STICK & TIG stud 17 is connected to a first input of switchover circuit 86 by conductor 71. Stud 17 will typically be at +80 volts before the arc is struck and +20 volts after the arc is struck. A first tap point on resistor 93 is connected to a second input of switchover circuit 86 by conductor 94. The voltage on conductor 94 will follow, but will be less than, the voltage on stud 17. A second tap point on resistor 93 is connected to a third input of switchover circuit 86 by conductor 91. The voltage on conductor 91 will follow, but will be less than, the voltage on conductor 94 or stud 17. A tap point on resistor 45 is connected to a fourth input of switchover circuit 86 by conductor 82. The voltage on conductor 82 will typically be +80 volts before the arc is struck and, after the arc is struck, will be between +80 volts and the voltage on stud 17.

It will be appreciated that, although stud 17 is the reference point, the voltage on stud 17 closely follows the voltage on stud 18.

Figure 8:
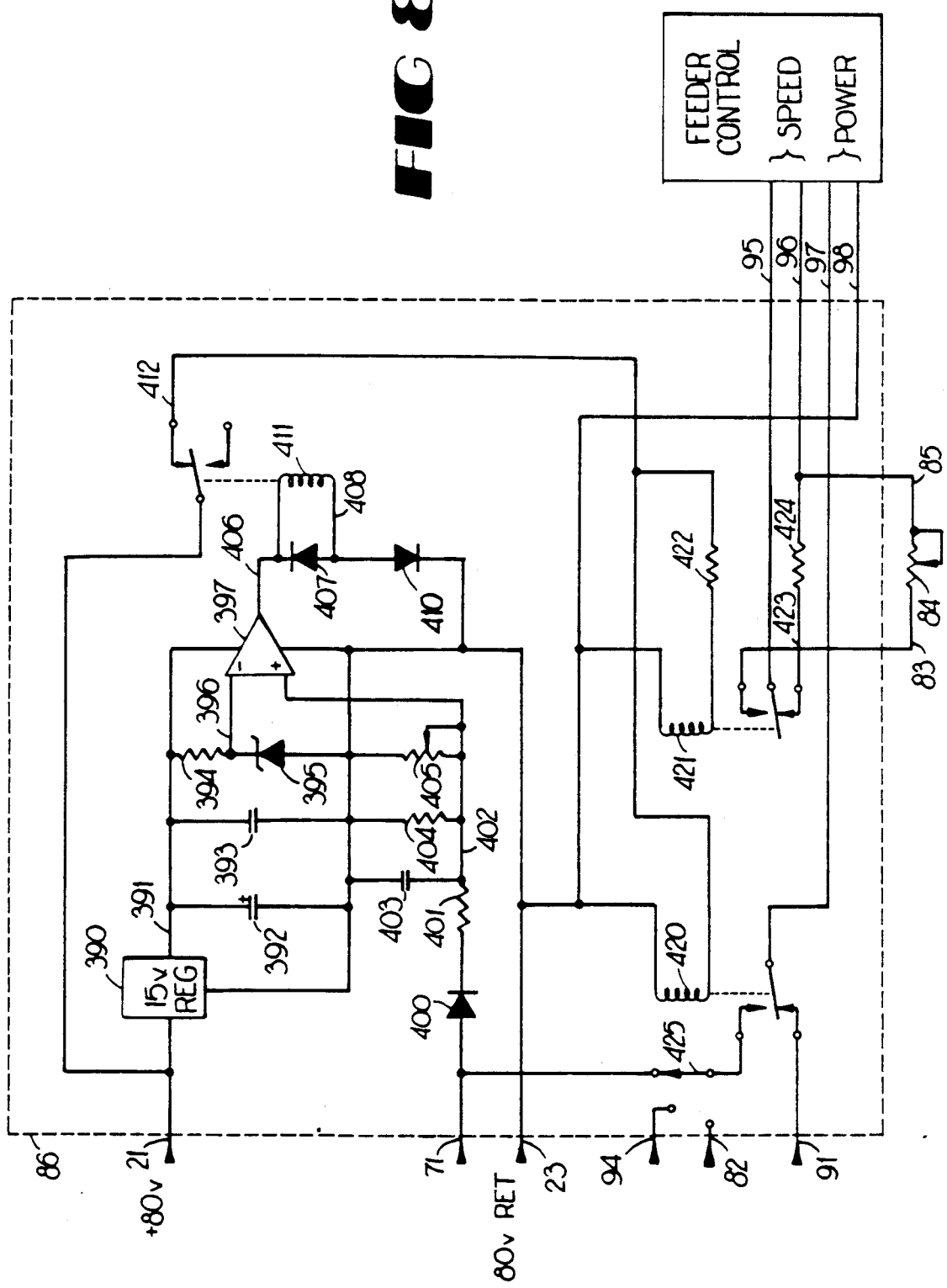
FIG. 8 is a schematic diagram of the high/low feeder voltage switchover control circuit of the preferred embodiment.

Turn now to FIG. 8, which is a schematic diagram of high/low voltage switchover circuit 86. The +80 volt conductor 21 is connected to the input of a 15 volt regulator 390 and to one contact of a normally closed pair of contacts on relay 411. The 80 volt return conductor 23 is connected to the ground of regulator 390, the negative terminal of filter capacitor 392, one end of filter capacitor 393, the anode of 8.2 volt zener diode 395, the ground input of op-amp 397, the cathode of blocking diode 410, one end of 0.1 microfarad smoothing capacitor 403, one end of 27 kilohm resistor 404, and one end of 250 kilohm potentiometer 405. The regulated +15 volt output of regulator 390 is connected by conductor 391 to the positive terminal of capacitor 392, the other end of capacitor 393, one end of 6.8 kilohm resistor 394, and to the VCC input of op-amp 397.

The other end of resistor 394 is connected by conductor 396 to the cathode of zener diode 395 and the inverting input of op-amp 397. Resistor 394 and zener diode 395 therefore form a voltage reference for op-amp 397.

The STICK/TIG stud 17 is connected by conductor 71 to the anode of blocking diode 400. The cathode of diode 400 is connected to conductor 402 through 82 kilohm resistor 401. Conductor 402 is connected to the non-inverting input of op-amp 397, the other end of capacitor 403, the other end of resistor 404, and to the wiper and other end of potentiometer 405. It will be appreciated that resistors 401 and 404 and potentiometer 405 form an adjustable voltage divider. Potentiometer 405 is set so that, when the voltage on conductor 71 rises above the desired voltage input level of feeder control 99, the voltage on the non-inverting input of op-amp 397 is greater than the voltage on its inverting input. This causes the output of op-amp 397 to rise to near the positive rail, conductor 391. Capacitor 403 smooths out the voltage on conductor 71 so that op-amp 397 does not respond to the voltage transients causes by the switching action of transistors 56a–56f of FIG. 2.

The output of op-amp 397 is connected by conductor 406 to the cathode of surge protection diode 407 and to one end of the coil of relay 411. The anode of diode 407 and the other end of the coil of relay 411 are connected by conductor 408 to the anode of blocking diode 410. The cathode of diode 410 is connected to the 80 volt return conductor 23.

It is well known to place a surge protection diode 407 in parallel with the coil of a relay such as relay 411 to absorb the voltage spike when relay 411 is de-energized. However, even with diode 407, conductor 406 may be momentarily pulled below conductor 23 by the forward voltage drop of diode 407. This momentary voltage pulse has caused erratic operation of op-amp 397. The inventor has not taken steps to ascertain whether this erratic operation is caused by a phantom diode or phantom transistor in op-amp 397, or by some other characteristic. However, the insertion of blocking diode 410 prevents this momentary voltage pulse from affecting op-amp 397 by isolating diode 407 and the coil of relay 411 from conductor 23.

The other contact of relay 411 is connected by conductor 412 to one end of the coil of relay 420, and to one end of the coil of relay 421 through 3.3 kilohm voltage reduction resistor 422. The other end of the coil of relay 420 and relay 421 are connected to 80 volt return conductor 23. Relays 420 and 421 each have a SPDT set of contacts.

The pole contact of relay 421 is connected by conductor 95 to the speed control input of feeder control 99. The normally closed contact of relay 421 is connected by conductor 423 to one end of a 12 kilohm resistor 424. The other end of resistor 424 is connected to conductor 96. The normally open contact of relay 421 is connected by conductor 83 to one end of 11 kilohm potentiometer 84. The wiper and other end of potentiometer 84 are connected by conductor 85 to conductor 96. Conductor 96 is connected to the speed control return input of feeder control 99.

The normally closed contact of relay 420 is connected by conductor 91 to the second tap point on resistor 93 of FIG. 2. The normally open contact of relay 420 is connected to the pole of SP3T switch 425. The first position of switch 425 connects the normally open contact of relay 420 to conductor 71, which is connected to STICK/TIG stud 17 of FIG. 2. The second position of switch 425 connects the normally open contact of relay 420 to the first tap point on resistor 93 of FIG. 2 through conductor 94. The third position of switch 425 connects the normally open contact of relay 420 to the tap point on arc sustaining resistor 45 of FIG. 2 through conductor 82.

The pole contact of relay 420 is connected by conductor 97 to the power voltage input of feeder control 99. The power voltage return of feeder control 99 is connected by conductor 98 to the 80 volt return conductor 23.

Before an arc is struck, the voltage on conductor 71 will be high, approximately 80 volts. The voltage on conductor 402 will therefore be greater than the trip voltage on conductor 396. The output of op-amp 397 will then be approximately 14 volts, thereby energizing relay 411. This de-energizes relays 420 and 421. The second tap point on resistor 93 of FIG. 2 will therefore be connected through conductor 91, the contacts of relay 420, and conductor 97 to the power voltage input of feeder control 99. If feeder control 99 is specified for, say, a 40 volt input, then the second tap point of resistor 93 of FIG. 2 is adjusted to give 40 volts on conductor 97 when the voltage on conductor 71 is 80 volts.

After an arc is struck, the voltage on conductor 71 will drop to approximately 20 volts. The voltage on conductor 402 will fall below the trip voltage on conductor 396 and relay 411 will be de-energized. Relays 420 and 421 will be connected through conductor 412 and the contacts of relay 411 to +80 volt conductor 21 and therefore energized. The power voltage input of feeder control 99 will therefore be connected through conductor 97 and the normally open contacts of relay 420 to the pole of switch 425. Switch 425 is placed in a selected position so that the voltage on conductor 97 is closest to the desired voltage, 40 volts in this example. In the example given, the voltage on conductor 71 is only 20 volts, so switch 425 positions 2 or 3 would be selected.

It will be appreciated that a different feeder control 99, such as an arc feeder control, will require a different power input voltage, typically 20 volts. In this case switch 425 would most probably be set to position 1, the voltage on conductor 71. It will also be appreciated that, in some applications, it may be desirable to provide another switch similar to switch 425 to allow selection of different voltage points when relay 420 is energized. It will also be appreciated that it may be desirable to have switch 425 connected to potentiometer 405, or a switchable voltage divider network instead of potentiometer 405, so that a welder could select a position on switch 425 and automatically obtain the desired feeder voltage on conductor 97 and the corresponding desired resistance of potentiometer 425.

In a similar manner, before an arc is struck, relay 421 will be de-energized, thereby connecting resistor 424 across the speed control inputs of feeder control 99 to yield a slow, fixed wire feed speed to allow the welder to adjust the wire length.

Likewise, after an arc is struck, relay 421 will be energized, thereby connecting potentiometer 84 across the speed control inputs of feeder control 99 to yield the higher, welder-set, wire feed speed desired for the actual welding operation. It will be appreciated that potentiometer 84 may be contained within feeder control 99 so that the welder will have convenient access for adjusting the wire feed speed.

Figure 9:
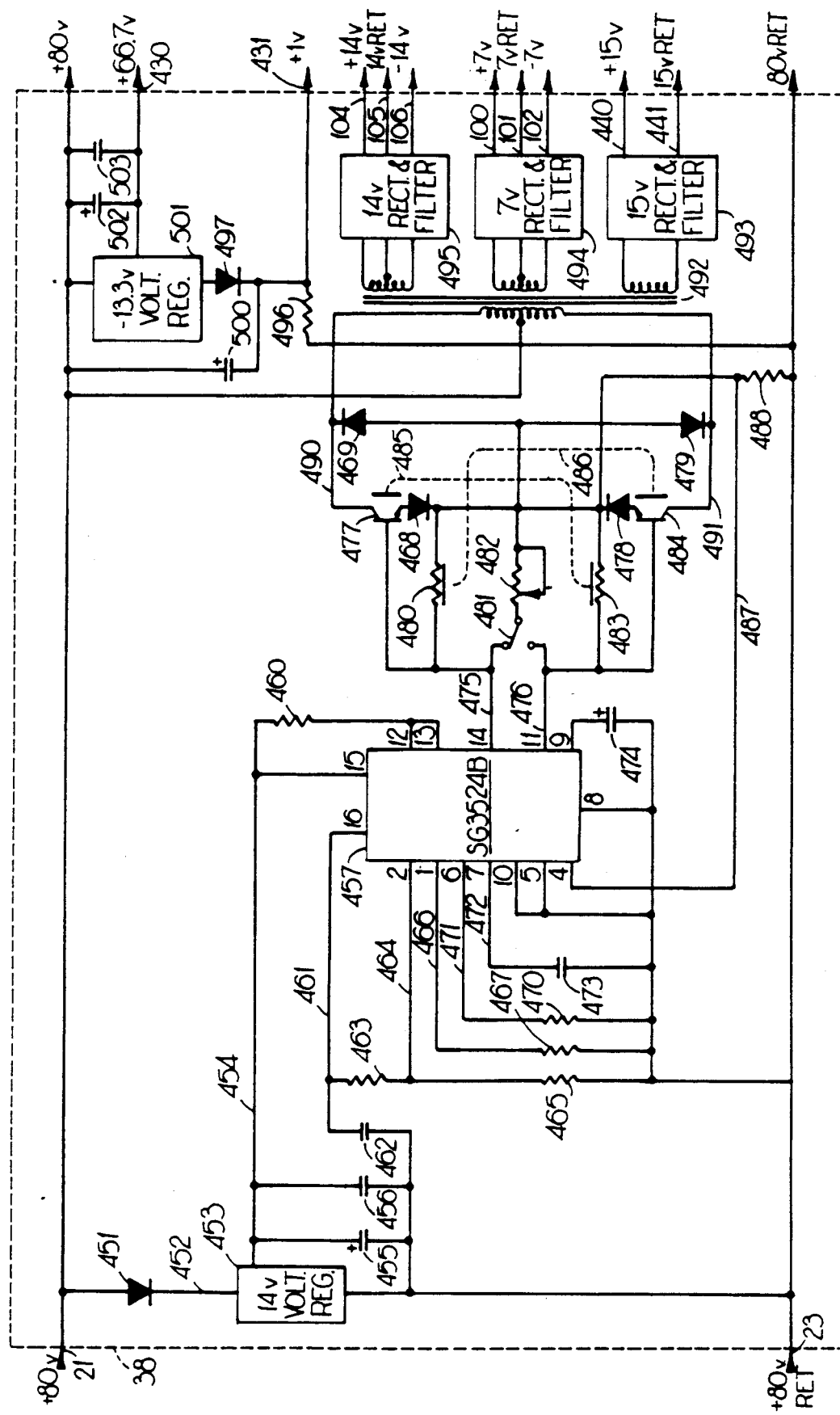
FIG. 9 is a schematic diagram of the power supply circuits of the preferred embodiment.

Turn now to FIG. 9, which is a schematic diagram of circuit power supplies 38. Input power is provided to power supplies 38 by +80 volt conductor 21 and 80 volt return conductor 23 which also serves as the circuit ground. Regulator 453 and filter capacitors 455 and 456 provide regulated 14 volts to PIN 15 of modulator 457. Modulator 457 is a regulating pulsewidth modulator such as the SG3524B manufactured by Silicon General, Garden Grove, Calif. The SG3524B, although almost identical in overall function to the SG3524/LM3524, is an improved device with additional protection features and should be used, in circuit power supplies 38, instead of the SG3524 manufactured by Silicon General, or the LM3524 manufactured by National Semiconductor Corporation, Santa Clara, Calif. Capacitor 462 provides additional filtering for the +5 volt regulated output (PIN 16) of modulator 457.

Resistor 470 and capacitor 473 were selected to yield a frequency of approximately 15 kHz for the oscillator in modulator 457. This frequency is not critical but should be within the input frequency specification of power transformer 492. Resistors 463 and 465 form a voltage divider which places approximately 2.5 volts on the non-inverting input (PIN 2) of the error amplifier of modulator 457. The inverting input (PIN 1) of this error amplifier is connected to circuit ground 23 through an input current balancing resistor 467.

The compensation input (PIN 9) of modulator 457 is connected to circuit ground 23 through one microfarad capacitor 474. It will be appreciated that, as configured, and except as described below, the error amplifier of modulator 457 will charge capacitor 474 to approximately 4 to 5 volts, thereby yielding an output pulsewidth of about 90 percent of the period of the frequency of the oscillator of modulator 457.

The shutdown input (PIN 10) of modulator 457 is not used and is connected to circuit ground 23.

Overcurrent protection for transistors 477 and 484 is provided by the current limiter of modulator 457. The CL− input (PIN 5) of modulator 457 is connected to circuit ground 23. The CL+ input (PIN 4) of modulator 457 is, as explained below, connected to sense the current passing through transistors 477 and 484.

If this current exceeds the safe value for transistors 477 and 484, the current limiter of modulator 457 begins discharging capacitor 474 and lowering the voltage on the compensation input of modulator 457. This reduces the pulsewidth, and therefore the current through transistors 477 and 484.

The collectors (PINS 12 and 13) of the output transistors of modulator 457 are connected to +14 volt conductor 454 through 110 ohm current limiting resistor 460. The emitter (PIN 14) of the Q output transistor of modulator 457 is connected by conductor 475 to the base of NPN Darlington power transistor 477, one end of 47 ohm base shunt resistor 480, and one contact of SPDT switch 481. The emitter (PIN 11) of the negated Q output transistor of modulator 457 is connected by conductor 476 to the base of NPN Darlington power transistor 484, one end of 47 ohm base shunt resistor 483, and the other contact of switch 481.

The emitter of transistor 477 is connected to the anode of blocking diode 468. The collector of transistor 477 is connected by conductor 490 to the cathode of reverse voltage protection diode 469 and one end of the primary of power transformer 492.

The emitter of transister 484 is connected to the anode of blocking diode 478. The collector of transistor 484 is connected by conductor 491 to the cathode of reverse voltage protection diode 479 and to the other end of the primary of power transformer 492. The center tap of the primary of power transformer 492 is connected to +80 volt conductor 21.

The pole of switch 481 is connected to one end of 250 ohm potentiometer 482. The wiper and other end of potentiometer 482, the other end of base shunt resistors 480 and 483, the cathodes of blocking diodes 468 and 478, the anodes of reverse voltage protection diodes 469 and 479, and the CL+ input of modulator 457 are connected by conductor 487 to one end of 0.04 ohm current sensing resistor 488. The other end of resistor 488 is connected to 80 v return conductor 23.

Ignoring, for a moment, switch 481, potentiometer 482, resistors 480 and 483, and diodes 468, 469, 478 and 479, it will be appreciated that modulator 457, transistors 477 and 484, resistor 488, and transformer 492 form a conventional inverter power supply. Current passing through transistors 477 and 484 passes through resistor 488 and the resulting voltage developed across resistor 488 is applied to the CL+ input of modulator 457. The width of the output pulses of modulator 457 is therefore reduced if the current exceeds the desired value.

However, in a conventional inverter, transistors 477 and 484 must be a matched pair. If the match is not good, then one of the transistors will draw significantly more current, heat up, draw even more current, and so on, with thermal runaway and destruction of the transistor being the usual result, frequently followed by destruction of the other transistor.

Switch 481 and potentiometer 482 allow the safe use of unmatched transistors for transistors 477 and 484. Assume that transistor 477 has the higher beta and draws more current than transistor 484. Switch 481 is therefore placed in the first position so that the base of transistor 477 is shunted by potentiometer 482. Potentiometer 482 is then adjusted to absorb some of the output of modulator 457 so that transistor 477 receives less base drive current and therefore draws the same collector current as transistor 484. The transistors 477 and 484 are now "balanced."

If transistor 484 has the higher beta, switch 481 would be placed in the second position and potentiometer 482 adjusted to reduce the base and collector currents of transistor 484. It will be appreciated that resistor 460 limits the available output current of modulator 457 so that potentiometer 482 can draw base drive current away from transistor 477 or 484, as appropriate.

The value of potentiometer 482 is not critical but should be large enough that, when in the maximum resistance setting, negligible drive current is shunted away from the transistor base, and low enough so that the adjustment is not confined to a very small portion of the range of potentiometer 482.

It will be appreciated that a prior art method of balancing unmatched transistors is to connect a potentiometer between the bases of transistors 477 and 484 and connect the wiper of the potentiometer to conductor 487. However, this prior art method is unsatisfactory because of two problems. The capacitance across the potentiometer couples the base drive signal from the base of transistor 477 to the base of transistor 484, and vice-versa, thus simultaneously turning on both transistors 477 and 484, an undesirable, inefficient, and often destructive result. Also, there is a small, but significant, resistance between the resistance element and the wiper of the potentiometer. This also allows cross-coupling of the base drive signals and can lead to the same undesired, inefficient, and destructive result. In the preferred embodiment, potentiometer 482 does not connect between the bases of transistors 477 and 484 and therefore there is no cross-coupling of the base drive signals.

Assume now that switch 481 and potentiometer 482 have been set so that transistors 477 and 484 are "balanced." Assume now that, because of different collector-to-case heat transfer characteristics, different case-to-heatsink heat transfer characteristics, or some other reason, transistor 477 becomes hotter than transistor 484. Transistor 477 will then draw more collector current, which causes it to become even hotter, and so on, with thermal runaway and destruction again being the likely result.

Resistors 480 and 483 act to prevent this undesired event from occurring. It will be appreciated that resistors 480 and 483 shunt base drive current away from transistors 477 and 484, respectively. Resistors 480 and 483 have a positive resistance-temperature coefficient. Resistor 480 is thermally connected 486 to the case of transistor 484. Resistor 483 is thermally connected 485 to the case of transistor 477. If transistor 477 draws more collector current and becomes hotter than normal, it will heat up resistor 483 hotter than normal. This increases the resistance of resistor 483 so transistor 484 receives more base drive current and draws more collector current so that transistors 477 and 484 remain "balanced." Also, the increase in current causes modulator 457 to decrease the output pulse width, thereby limiting the total average current of transistors 477 and 484 to a safe value.

In the preferred embodiment, transistors 477 and 484 are 350 volt, 20 amp, NPN Darlington power transistors, such as the MJ10000, manufactured by Motorola, Inc., Phoenix, Ariz. The MJ10000 has an internal diode, with its cathode connected to the collector, and its anode connected to the emitter, to help prevent a negative collector voltage from destroying the transistor. However, the inventor has found that, in the preferred embodiment, the negative collector voltage caused by transformer 492 did destroy transistors 477 and 484. It is not known whether the failures occurred because the internal diode of the MJ10000 was unable to handle the current, the base-collector junction became forward biased and the MJ10000 operated in the inverted mode, or because of some other mechanism. The use of higher power, more expensive power transistors for 477 and 484 did solve the problem but increased the cost.

Diodes 468, 469, 478 and 479 prevent these failures from occurring. Diodes 468 and 478 prevent transistors 477 and 484 from operating in the inverted mode and also prevent current from passing through their internal diodes. Diodes 469 and 479 are then necessary to absorb the negative voltage spikes produced by transformer 492. Diodes 469 and 479 should be fast recovery diodes. This allows the use of the lower power, less expensive MJ10000's for transistors 477 and 484.

Transformer 492 has several secondary windings. One of these windings is connected to 14 volt rectifier & filter 495. Rectifier & filter 495 provides +14 volts on conductor 104 and −14 volts on conductor 106. The 14 v return is conductor 105. A second winding is connected to 7 volt rectifier & filter 494. Rectifier & filter 494 provides +7 volts on conductor 100 and −7 volts on conductor 102. The 7 v return is conductor 101. A third winding is connected to 15 volt rectifier & filter 493. Rectifier & filter 493 provides a regulated +15 volts on conductor 440. The 15 v return is conductor 441. Separate secondary windings and separate return conductors are used because the circuits that are powered operate at different circuit "ground" potentials. The design of rectifier & filter 493, 494 and 495 is well known to those skilled in the art.

The +80 volt conductor 21 is connected to the positive terminal of filter capacitors 500 and 502, one terminal of high frequency filter capacitor 503, and to the "ground" input of −13.3 volt voltage regulator 501. The −13.3 volt output of regulator 501 is connected to the other end of capacitors 502 and 503 and provides a regulated −13.3 volts on conductor 430. The voltage on conductor 430 is a regulated −13.3 volt with respect to +80 v conductor 21. Conductor 430 therefore has an unregulated, nominal potential of +66.7 volts with respect to 80 v return conductor 23.

The $V_{EE}$ input of regulator 497 is connected to the anode of blocking diode 497. The cathode of diode 497 and the other end of capacitor 500 are connected by conductor 431 to one end of 10 ohm resistor 496. The other end of resistor 496 is connected to 80 v return conductor 23. Conductor 431 provides the unregulated +1 volt signal which is used in pulsewidth modulators 32 and 34 of FIG. 2. The total current through regulator 501 is approximately 100 milliamps and develops the 1 volt drop across resistor 496.

The preferred embodiment of the present invention discloses a welding system with a central welding power supply and numerous, high efficiency weld selector stations and also discloses a weld selector station with the capability of adjusting arc characteristics, with automatic input voltage compensation, with the capability of accommodating different types of welding, and with a power supply which utilizes inexpensive, unmatched, low power transistors. Although the preferred embodiment of the present invention has been described with particularity, it will be understood that numerous modifications and variations are possible. Accordingly, the scope of the present invention is to be limited only by the claims below.

I claim:

1. An electronic welder, comprising:
   a power supply for providing operating voltage and operating current;
   a voltage divider responsive to said operating voltage for providing a first signal;

control means for providing a second signal;

a pulsewidth modulator for providing a third signal having a pulsewidth responsive to said first signal and said second signal; and output means responsive to said third signal for providing welding power to a welding operation.

2. The electronic welder of claim 1 wherein:

said voltage divider comprises a first resistor, a second resistor, and a third resistor, connected in series, said second resistor having a resistance significantly less than the resistance of said voltage divider; and said first signal is the voltage developed across said second resistor.

3. The electronic welder of claim 2 wherein:

said pulsewidth modulator comprises an operational amplifier having a differential input; and said voltage across said second resistor is applied to said differential input.

4. The electronic welder of claim 3 wherein said operational amplifier is a transconductance amplifier operating in an open loop configuration.

5. The electronic welder of claim 4 and further comprising:

a load connected to the output of said transconductance amplifier, said load having a resistance such that said transconductance amplifier operates in a linear region when said voltage across said second resistor is applied to said differential input.

6. The electronic welder of claim 1 wherein said pulsewidth modulator decreases said pulsewidth in response to an increase in said operating voltage.

7. The electronic welder of claim 1 and further comprising:

a voltage regulator for providing a regulated voltage; and means connected to said power supply and responsive to said operating voltage for providing an unregulated voltage;

wherein said voltage divider is connected between said regulated voltage and said unregulated voltage.

8. The electronic welder of claim 7 wherein said pulsewidth modulator comprises said voltage regulator.

9. An electronic welder for use with an external power supply, comprising:

input terminals for receiving operating voltage and operating current from said external power supply;

a voltage divider responsive to said operating voltage for providing a first signal;

control means for providing a second signal;

a pulsewidth modulator for providing a third signal having a pulsewidth responsive to said first signal and said second signal; and output means responsive to said third signal for providing welding power to a welding operation.

10. The electronic welder of claim 9 wherein:

said voltage divider comprises a first resistor, a second resistor, and a third resistor, connected in series, said second resistor having a resistance significantly less than the resistance of said voltage divider; and said first signal is the voltage developed across said second resistor.

11. The electronic welder of claim 10 wherein:

said pulsewidth modulator comprises an operational amplifier having a differential input; and said voltage across said second resistor is applied to said differential input.

12. The electronic welder of claim 11 wherein said operational amplifier is a transconductance amplifier operating in an open loop configuration.

13. The electronic welder of claim 12 and further comprising:

a load connected to the output of said transconductance amplifier, said load having a resistance such that said transconductance amplifier operates in a linear region when said voltage across said second resistor is applied to said differential input.

14. The electronic welder of claim 9 wherein said pulsewidth modulator decreases said pulsewidth in response to an increase in said operating voltage.

15. The electronic welder of claim 9 and further comprising:

a voltage regulator for providing a regulated voltage; and means connected to said power supply and responsive to said operating voltage for providing an unregulated voltage.

16. The electronic welder of claim 15 wherein said pulsewidth modulator comprise said voltage regulator.

17. The electronic welder of claim 16 wherein said unregulated voltage is derived from a predetermined one of said input terminals.

18. For use with an electronic welder which provides a pulsed output having a selectable pulsewidth, a method for improving the performance of said electronic welder, comprising the steps of:

monitoring an input voltage of said electronic welder; and changing said pulsewidth in response to changes in said input voltage.

19. The method of claim 18 wherein said step of changing comprises decreasing said pulsewidth in response to an increase in said input voltage.

20. The method of claim 19 wherein said step of monitoring comprises measuring the voltage across a predetermined resistor in a voltage divider connected to said input voltage, said predetermined resistor having a resistance which is significantly less than the resistance of said voltage divider.

* * * * *